(12) United States Patent
Iwahashi

(10) Patent No.: US 8,482,387 B2
(45) Date of Patent: Jul. 9, 2013

(54) RFID TAG INFORMATION PROCESSING APPARATUS, SYSTEM, METHOD, AND COMPUTER-READABLE STORAGE MEDIUM FOR JUDGING A MOVEMENT DIRECTION OF AN RFID TAG

(75) Inventor: Naomasa Iwahashi, Kyoto (JP)

(73) Assignee: Omron Corporation, Kyoto (JP)

( * ) Notice: Subject to any disclaimer, the term of this patent is extended or adjusted under 35 U.S.C. 154(b) by 452 days.

(21) Appl. No.: 12/864,621

(22) PCT Filed: Feb. 25, 2009

(86) PCT No.: PCT/JP2009/053393
§ 371 (c)(1),
(2), (4) Date: Jul. 26, 2010

(87) PCT Pub. No.: WO2009/113393
PCT Pub. Date: Sep. 17, 2009

(65) Prior Publication Data
US 2010/0302010 A1   Dec. 2, 2010

(30) Foreign Application Priority Data

Mar. 12, 2008   (JP) .................................. 2008-063202

(51) Int. Cl.
*G08B 21/00* (2006.01)

(52) U.S. Cl.
USPC ..... 340/10.1; 340/10.3; 340/10.4; 340/572.1; 340/572.4; 342/146; 342/147; 235/384; 700/215

(58) Field of Classification Search
USPC ............... 340/572, 10; 700/213–226; 342/44, 342/147; 343/855; 285/375, 384; 235/375, 235/384
See application file for complete search history.

(56) References Cited

U.S. PATENT DOCUMENTS

| | | | |
|---|---|---|---|
| 2005/0035862 A1* | 2/2005 | Wildman et al. | 340/573.1 |
| 2005/0280538 A1* | 12/2005 | Kawai et al. | 340/572.1 |
| 2006/0022800 A1* | 2/2006 | Krishna et al. | 340/10.2 |
| 2006/0086790 A1* | 4/2006 | Sloan et al. | 235/384 |
| 2007/0213951 A1 | 9/2007 | Van Eeden | |
| 2007/0273530 A1 | 11/2007 | Koezuka et al. | |
| 2009/0051537 A1 | 2/2009 | Konishi et al. | |

FOREIGN PATENT DOCUMENTS

| | | |
|---|---|---|
| GB | 2 429 559 A | 2/2007 |
| JP | 9-90026 A | 4/1997 |
| JP | 2005-37365 A | 2/2005 |
| JP | 2005-157698 A | 6/2005 |
| JP | 2006-71466 | 3/2006 |
| JP | 2006-134242 A | 5/2006 |
| JP | 2006-313530 A | 11/2006 |
| WO | WO 2008/092366 A1 | 8/2008 |

* cited by examiner

*Primary Examiner* — Mohammad Ghayour
*Assistant Examiner* — Mark Rushing
(74) *Attorney, Agent, or Firm* — Dickstein Shapiro LLP

(57) ABSTRACT

An apparatus, system, and method for judging a movement direction of an RFID tag in a case where read information acquired from a first region and read information acquired in a second region which overlap the first region indicate that the RFID tag has moved out of a part of the first region which part does not overlap the second region. The described embodiments include a movement direction judging section, a detection frequency information acquisition section, a movement judging section, an output judging section, and an output section.

9 Claims, 13 Drawing Sheets

| TAG ID | F1 | F2 | DF1 | DF2 | TR1 | TR2 | TR3 | TR4 | Time | RT | LT | DR | DL | End |

FIG. 4

| TAG ID | TAG ID |
|---|---|
| F1 | FLAG INDICATING WHETHER OR NOT TAG ID COULD BE READ FROM FIRST REGION |
| F2 | FLAG INDICATING WHETHER OR NOT TAG ID COULD BE READ FROM SECOND REGION |
| DF1 | FLAG INDICATING WHETHER OR NOT TAG ID COULD BE READ FROM FIRST REGION IN PREVIOUS READING PROCESS |
| DF2 | FLAG INDICATING WHETHER OR NOT TAG ID COULD BE READ FROM SECOND REGION IN PREVIOUS READING PROCESS |
| TR1 | DETECTION START TRIGGER 1 (RISING OF FIRST REGION) |
| TR2 | DETECTION START TRIGGER 2 (FALLING OF FIRST REGION) |
| TR3 | DETECTION START TRIGGER 3 (RISING OF SECOND REGION) |
| TR4 | DETECTION START TRIGGER 4 (FALLING OF SECOND REGION) |
| Time | ELAPSED PERIOD OF TIME FROM TR2 OR TR4 (THE NUMBER OF READING PROCESSES) |
| RT | FLAG INDICATING MOVEMENT IN DIRECTION POINTING FROM FIRST REGION TOWARDS SECOND REGION |
| LT | FLAG INDICATING MOVEMENT IN DIRECTION POINTING FROM SECOND REGION TOWARDS FIRST REGION |
| DR | LAST VALUE OF RT |
| DL | LAST VALUE OF LT |
| End | END FLAG |

FIG. 10

| TAG ID | F1 | F2 | DF1 | DF2 | TR1 | TR2 | TR3 | TR4 | Time | RT | LT | DR | DL | End |
|---|---|---|---|---|---|---|---|---|---|---|---|---|---|---|
| T201 | 0 | 0 | 0 | 0 | 0 | 0 | 0 | 0 | 0 | 0 | 0 | 0 | 0 | 0 |

FIG. 11

| TAG ID | F1 | F2 | DF1 | DF2 | TR1 | TR2 | TR3 | TR4 | Time | RT | LT | DR | DL | End |
|---|---|---|---|---|---|---|---|---|---|---|---|---|---|---|
| T201 | 1 | 0 | 1 | 0 | 1 | 0 | 0 | 0 | 1 | 0 | 0 | 0 | 0 | 0 |

FIG. 12

| TAG ID | F1 | F2 | DF1 | DF2 | TR1 | TR2 | TR3 | TR4 | Time | RT | LT | DR | DL | End |
|---|---|---|---|---|---|---|---|---|---|---|---|---|---|---|
| T201 | 1 | 1 | 1 | 1 | 1 | 1 | 0 | 0 | 1 | 0 | 0 | 0 | 0 | 0 |

FIG. 13

| TAG ID | F1 | F2 | DF1 | DF2 | TR1 | TR2 | TR3 | TR4 | Time | RT | LT | DR | DL | End |
|---|---|---|---|---|---|---|---|---|---|---|---|---|---|---|
| T201 | 0 | 1 | 0 | 1 | 1 | 1 | 0 | 0 | 2 | 0 | 0 | 0 | 0 | 1 |

FIG. 14
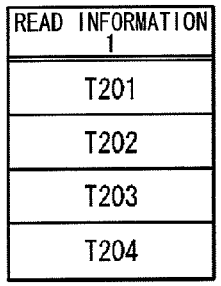
FIG. 15
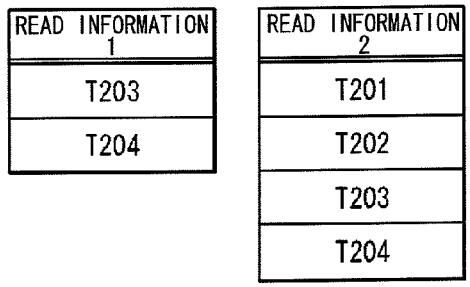
FIG. 16
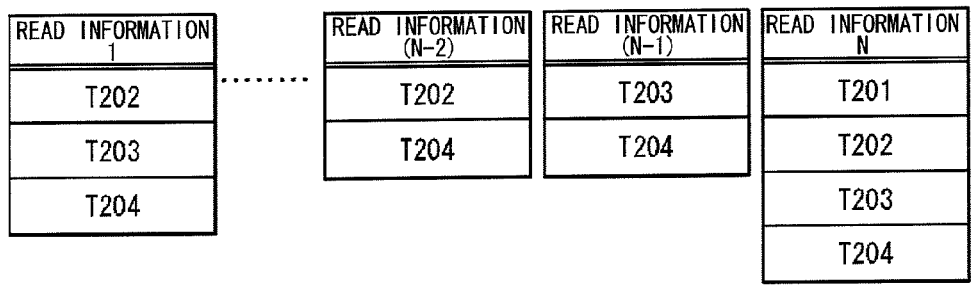
FIG. 17
| ID | TAG ATTRIBUTE |
|---|---|
| T201 | MOVING TAG |
| T202 | REMAINING TAG |
| T203 | REMAINING TAG |
| T204 | REMAINING TAG |

F I G. 2 0
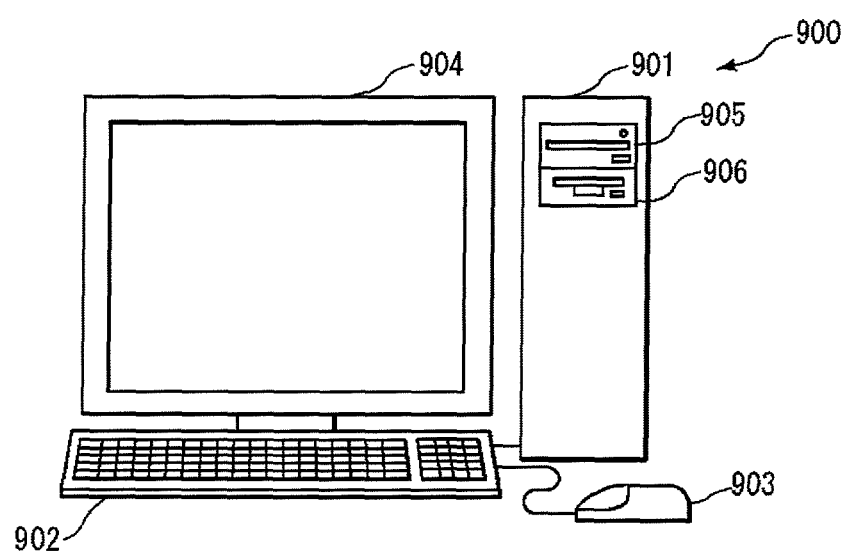

RFID TAG INFORMATION PROCESSING APPARATUS, SYSTEM, METHOD, AND COMPUTER-READABLE STORAGE MEDIUM FOR JUDGING A MOVEMENT DIRECTION OF AN RFID TAG

TECHNICAL FIELD

The present invention relates to a tag information processing apparatus etc. which judges a movement direction of an RFID (Radio Frequency Identification) tag.

BACKGROUND ART

Patent Literature 1, for example, discloses a conventional tag information processing apparatus etc. in which a plurality of tag readers provided in a distance from one another, so as to measure a time lag between readings of a tag ID of a tag by these tag readers, and estimate a movement direction of the tag based on the time lag.

Patent Literature 2 discloses another conventional tag information processing apparatus in which each receiving terminal keeps radio wave intensity of an RFID tag, and a movement direction of the RFID tag is judged based on a temporal change in value of the radio wave intensity.

Citation List

Patent Literature 1

Japanese Patent Application Publication, Tokukai, No. 2005-157698 A (Publication Date: Jun. 16, 2005) (see page 1 and FIG. 1, for example)

Patent Literature 2

Japanese Patent Application Publication, Tokukai, No. 2006-71466 A (Publication Date: Mar. 16, 2006) (see page 1 and FIG. 1, for example)

However, according to the tag information processing apparatus disclosed in Patent Literature 1, a movement direction of an RFID tag is estimated based on a time lag between a time at which a first tag reader reads a tag ID of the RFID tag and a time at which a second tag reader reads the tag ID. Accordingly, in a case where a read area of the first tag reader and a read area of the second tag reader overlap each other, the first and second tag readers simultaneously read a tag ID of an RFID tag located in an area where the two read areas overlap each other. That is, it is impossible to obtain a time lag between a time at which the first tag reader reads the tag ID and a time at which the second tag reader reads the tag ID. This causes a problem that a movement direction of a tag cannot be accurately judged.

Further, according to the tag information processing apparatus disclosed in the Patent Literature 2, a movement direction of an RFID tag is judged based on a temporal change in intensity of radio waves received from an area where read areas do not overlap each other and from an area where read areas overlap each other. This may make it impossible to read a tag ID of an RFID tag whose read rate is low even if the RFID tag is located in a read area. In this case, the tag information processing apparatus incorrectly judges that the RFID tag has moved out of the read area. As such, there occurs a problem that it is impossible to accurately judge a movement direction of a tag based on such a judgment result.

SUMMARY OF INVENTION

A tag information processing apparatus of the present invention is a tag information processing apparatus which processes information acquired by carrying out an RFID tag reading process with respect to each of a first region and a second region which are different from each other and which have an overlapping region where the first region and the second region overlap each other, the tag information processing apparatus including: a first receiving section which receives first read information which is acquired by carrying out the RFID tag reading process with respect to the first region; a second receiving section which receives second read information which is acquired by carrying out the RFID tag reading process with respect to the second region; a movement direction judging section which judges a movement direction of an RFID tag in a case where and from a fact that the first read information and the second read information indicate that the RFID tag has moved out of a part of the first region which part does not overlap the second region; a detection frequency information acquisition section which acquires detection frequency information indicative of how many times first read information and/or second read information acquired by reading the RFID tag appears in plural sets of the first read information and the second read information which are acquired by carrying out the RFID tag reading process plural times and are then received by the first receiving section and the second receiving section; a movement judging section which judges, based on the detection frequency information acquired by the detection frequency information acquisition section, whether or not the RFID tag has moved out of both of the first region and the second region; an output judging section which judges whether or not the RFID tag whose movement direction has been judged by the movement direction judging section matches the RFID tag which has been judged, by the movement judging section, to have moved out of both of the first region and the second region; and an output section which outputs the movement direction judged by the movement direction judging section in a case where the output judging section judges that the RFID tag whose movement direction has been judged by the movement direction judging section matches the RFID tag which has been judged, by the movement judging section, to have moved out of both of the first region and the second region.

According to the arrangement, (i) a movement direction of an RFID tag is judged based on a result obtained by carrying out an RFID tag reading process with respect to the first region and the second region which overlap each other, (ii) appearance frequency of the RFID tag is acquired based on the result, (iii) it is determined, based on the appearance frequency, that the RFID tag has moved out of both of the first region and the second region, and (iv) the movement direction of the RFID tag is outputted in a case where the RFID tag whose movement direction has been judged matches the RFID tag which has moved out of both of the first region and the second region. This makes it possible to accurately detect a movement direction of an RFID tag.

A tag information processing system of the present invention is a tag information processing system which processes information acquired by carrying out an RFID tag reading process with respect to each of a first region and a second region which are different from each other and which have an overlapping region where the first region and the second region overlap each other, the tag information processing apparatus including: a first transmitting/receiving antenna which is capable of transmitting and receiving radio waves to/from the first region; a second transmitting/receiving antenna which is capable of transmitting and receiving radio waves to/from the second region; a first tag reader/writer which acquires first read information by carrying out the RFID tag reading process with respect to an RFID tag present in the first region with use of the first transmitting/receiving antenna; a second tag reader/writer which acquires second read information by carrying out the RFID tag reading process with respect to an RFID tag present in the second region with use of the second transmitting/receiving antenna; a first receiving section which receives the first read information acquired by the first tag reader/writer; a second receiving section which receives the second read information acquired by the second tag reader/writer; a movement direction judging section which (i) judges a movement direction of an RFID tag in a case where and from a fact that the first read information and the second read information indicate that the RFID tag has moved out of a part of the first region which part does not overlap the second region and (ii) acquires information thus judged; a detection frequency information acquisition section which acquires detection frequency information indicative of how many times first read information and/or second read information acquired by reading the RFID tag appears in plural sets of the first read information and the second read information which are acquired by carrying out the RFID tag reading process plural times and are then received by the first receiving section and the second receiving section; a movement judging section which judges, based on the detection frequency information acquired by the detection frequency information acquisition section, whether or not the RFID tag has moved out of both of the first region and the second region; an output judging section which judges whether or not the RFID tag whose movement direction has been judged by the movement direction judging section matches the RFID tag which has been judged, by the movement judging section, to have moved out of both of the first region and the second region; and an output section which outputs the movement direction judged by the movement direction judging section in a case where the output judging section judges that the RFID tag whose movement direction has been judged by the movement direction judging section matches the RFID tag which has been judged, by the movement judging section, to have moved out of both of the first region and the second region.

According to the arrangement, it is possible to accurately detect a movement direction of an RFID tag.

Additional objects, features, and strengths of the present invention will be made clear by the description below. Further, the advantages of the present invention will be evident from the following explanation in reference to the drawings.

BRIEF DESCRIPTION OF DRAWINGS

FIG. 4 is a view for explaining each item of the format in which the read information is accumulated in the embodiment.

FIG. 10 is a view showing a tag ID management table of the embodiment.

FIG. 11 is a view showing a tag ID management table of the embodiment.

FIG. 12 is a view showing a tag ID management table of the embodiment.

FIG. 13 is a view showing a tag ID management table of the embodiment.

FIG. 14 is a view showing read information accumulated by a detection frequency information acquisition section of the embodiment.

FIG. 15 is a view showing read information accumulated by the detection frequency information acquisition section of the embodiment.

FIG. 16 is a view showing read information accumulated by the detection frequency information acquisition section of the embodiment.

FIG. 17 is a view showing a tag ID management table of the embodiment.

FIG. 20 is a view schematically illustrating an example of an appearance of a computer system of the embodiment.

REFERENCE SIGNS LIST

Figure 1:
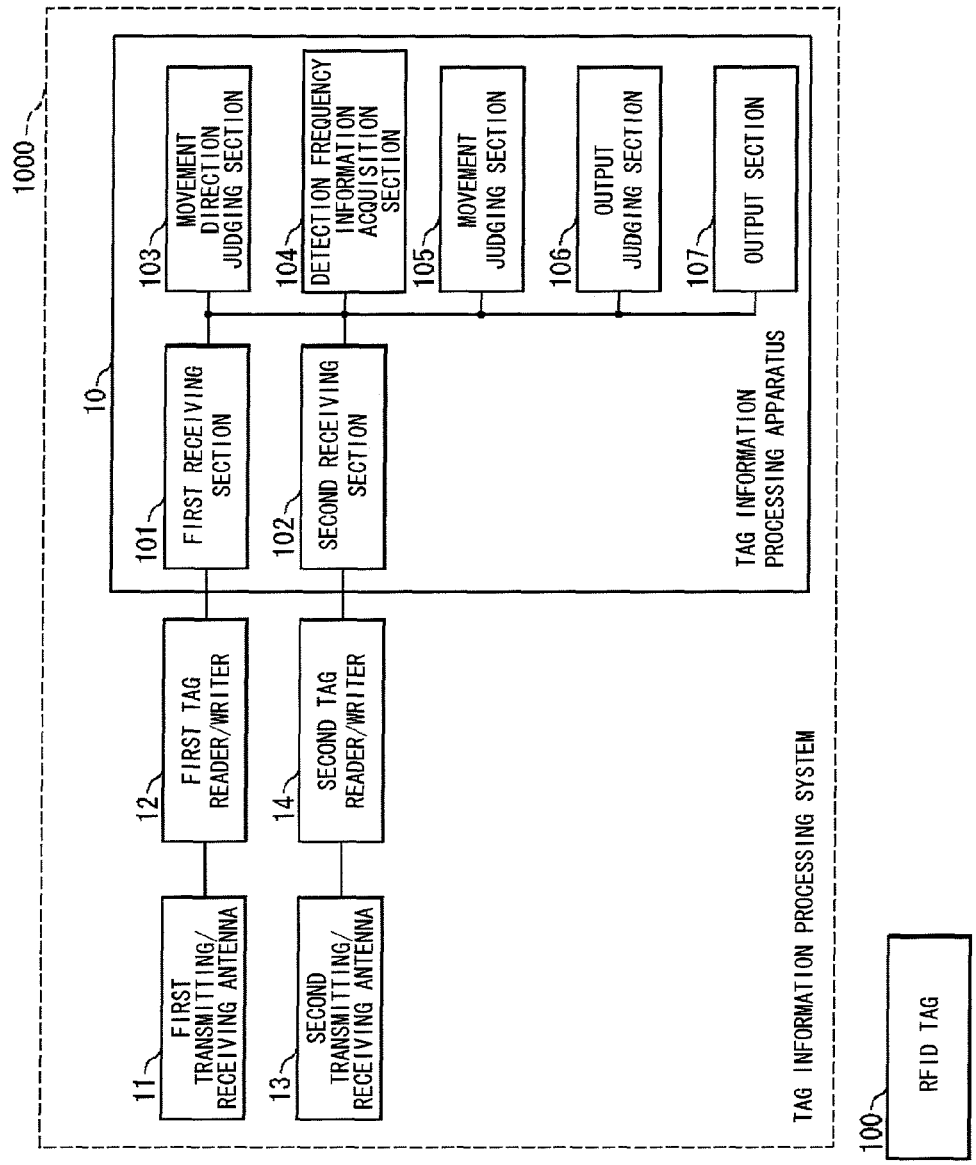
FIG. 1 is a block diagram showing a tag information processing system of an embodiment.

10: Tag information processing apparatus
11: First transmitting/receiving antenna
12: First tag reader/writer
13: Second transmitting/receiving antenna
14: Second tag reader/writer
30: Conveyer belt
100: RFID tag
101: First receiving section
102: Second receiving section
103: Movement direction judging section
104: Detection frequency information acquisition section
105: Movement judging section
106: Output judging section
107: Output section
200: Product
221: First region
222: Second region
223: Overlapping region
1000: Tag information processing system
2000: Information processing apparatus Description of Embodiments An embodiment of a tag information processing apparatus etc. is described below with reference to the drawings. Note that constituents which are given identical reference numerals operate in identical ways, and therefore may not be explained repeatedly.

(Embodiment)

FIG. 1 is a block diagram showing an arrangement of a tag information processing system of the present embodiment.

A tag information processing system 1000 includes a tag information processing apparatus 10, a first transmitting/receiving antenna 11, a first tag reader/writer 12, a second transmitting/receiving antenna 13, and a second tag reader/writer 14. In this embodiment, it is assumed that the tag information processing system 1000 processes one or more RFID tag 100. Specifically, it is assumed that the tag information processing system 1000 reads information of at least one RFID tag 100. The following description deals with an example in which a single RFID tag 100 is processed by the tag information processing system 1000. However, it is also possible that a plurality of RFID tags 100 having different identification information are processed by the tag information processing system 1000.

The tag information processing apparatus 10 includes a first receiving section 101, a second receiving section 102, a movement direction judging section 103, a detection frequency information acquisition section 104, a movement judging section 105, an output judging section 106, and an output section 107.

The tag information processing system 1000 carries out RFID tag reading with respect to a first region and a second region which partially overlap each other and are different from each other, and then judges a movement direction of an RFID tag based on information obtained by carrying out the RFID tag reading. Specifically, the first transmitting/receiving antenna 11 and the second transmitting/receiving antenna 13 are provided so that the first region and the second region, which are read by the first transmitting/receiving antenna 11 and the second transmitting/receiving antenna 13, respectively, overlap each other partially.

Information such as identification information is recorded on an RFID tag 100. The RFID tag 100 reads and transmits the information such as identification information in response to externally supplied information which instructs the RFID tag 100 to read the information. In the present embodiment, such information read from the RFID tag 100 is identification information of the RFID tag 100 (hereinafter referred to as "tag ID"), for example. Note that the information read from the RFID tag 100 can be any information, as long as it contains the tag ID. The tag ID may be any information, as long as a plurality of RFID tags 100 can be distinguished. For example, the tag ID may be serial number, name of the RFID tag 100, or information specific to the RFID tag 100. A structure of the RFID tag 100 and a frequency band in which the RFID tag 100 operates are not limited to specific ones. A plurality of RFID tags 100 may have an identical structure or may include RFID tags 100 which have different structures. A passive type RFID tag is normally used as the RFID tag 100, but an active type RFID tag may be also used as the RFID tag 100.

The first transmitting/receiving antenna 11 is an antenna that is capable of transmitting and receiving radio waves to/from the first region in which reading of an RFID tag 100 is carried out. The first transmitting/receiving antenna 11 transmits and receives information to/from a plurality of RFID tags 100 disposed in the first region. Specifically, the first transmitting/receiving antenna 11 gives the plurality of RFID tags 100 an instruction to supply identification information and receives information such as identification information supplied from the plurality of RFID tags 100. In the present embodiment, the first transmitting/receiving antenna 11 transmits and receives information to/from an RFID tag 100 plural times, i.e., carries out a reading process plural times with respect to the first region in which at least one RFID tag 100 is disposed. The "plural times" may be expressed as "N times" (N is an integer equal to or larger than 2). Such plural reading processes are preferably carried out successively. Note that such plural reading processes may be repeatedly carried out successively or may be carried out plural times so that read information read in a reading process of a first set of plural reading processes is used again as read information in a reading process of a second set of plural reading processes which reading process has the same ordinal number as the reading process of the first set. Directional characteristics etc. of the first transmitting/receiving antenna 11 are not limited to specific ones. The present embodiment deals with a case where the first transmitting/receiving antenna 11 is an antenna which both transmits and receives information. However, it is also possible that a transmitting antenna and a receiving antenna are separately provided as the first transmitting/receiving antenna 11. Moreover, the first transmitting/receiving antenna 11 may be constituted by a plurality of antennas.

The first tag reader/writer 12 reads information of an RFID tag 100 located in the first region plural times with the use of the first transmitting/receiving antenna 11 so as to acquire read information which is the information thus read. The read information is information read from the RFID tag 100. Specifically, the read information is identification information (i.e. tag ID) by which the RFID tag 100 is identified. In the present embodiment, the read information acquired by the first tag reader/writer 12 is referred to as "first read information". The first tag reader/writer 12 carries out such a reading process at least two times. However, normally, a read rate of an RFID tag 100 is not 100%. Therefore, in order to accurately judge a status of the RFID tag 100, it is preferable that the reading process is carried out at least three times. Moreover, it is preferable that such plural reading processes are carried out successively. Such plural reading processes may be carried out repeatedly. Further, such plural reading processes may be carried out plural times so that read information read in a reading process of a first set of plural reading processes is used again as read information in a reading process of a second set of plural reading processes which reading process has the same ordinal number as the reading process of the first set. Specifically, the first tag reader/writer 12 gives an instruction (e.g., reading command) to at least one RFID tag 100 located in the first region via the first transmitting/receiving antenna 11 so as to cause the at least one RFID tag 100 to supply read information (i.e., tag ID). Further, the first tag reader/writer 12 receives information including read information (i.e. tag ID) supplied from the at least one RFID tag located in the first region. Then, the first reader/writer acquires the read information (i.e. tag ID) from the information thus received. Normally, a process of reading read information of all of the RFID tags 100 located in the first region one time is deemed as one (1) reading process. In this specification, for example, a set of plural reading processes which are carried out under respective different reading conditions may be considered to be one (1) reading process. Read information acquired in one (1) reading process by the first tag reader/writer 12 is temporarily stored in a storage medium such as a memory (not shown), for example. The first tag reader/writer 12 can be realized by a device which carries out processing such as reading of an input signal, a driver of the device, communication means which transmits and receives information, or a driver of the communication means, for example. The present embodiment deals with a case where the first tag reader/writer 12 transmits and receives information. Alternatively, the first tag reader/writer 12 may include a transmitting section and a receiving section. Further, the first tag reader/writer 12 may be realized by an MPU, a memory, or the like. In this case, software which allows processing procedure of the first tag reader/writer 12 to be realized may be stored in a storage medium such as a ROM.

The second transmitting/receiving antenna 13 is an antenna that is capable of transmitting and receiving radio waves to/from the second region in which reading of an RFID tag 100 is carried out. Note that the first region and the second region are different from each other and overlap each other. The second transmitting/receiving antenna 13 is similar to the first transmitting/receiving section 11 except for a region to be read, and therefore is not explained repeatedly.

The second tag reader/writer 14 reads information of an RFID tags 100 located in the second region plural times with the use of the second transmitting/receiving antenna 13, and acquires read information which the information thus read. An arrangement of the second tag reader/writer 14 is similar to that of the first tag reader/writer 12, and is therefore not explained repeatedly. Note that the read information acquired by the second tag reader/writer 14 is hereinafter referred to as "second read information".

The tag information processing apparatus 10 is an apparatus that judges a movement direction of an RFID tag 100 based on information acquired in the reading processes carried out respectively with respect to each of the first region and the second region which overlap each other.

The first receiving section 101 receives the first read information which is acquired by reading an RFID tag located in the first region. The term "receiving" as used herein refers to receiving of an input signal supplied from another apparatus etc., receiving from input means such as a keyboard, or reading of information stored in a storage medium, for example. The present embodiment deals with an example in which the first receiving section 101 receives the first read information which is read by the first tag reader/writer 12. The first receiving section 101 normally receives read information every time a reading process is carried out, but may collectively receive plural sets of read information acquired by carrying out plural reading processes. The first receiving section 101 may cause the first read information thus received to be temporarily stored in a storage medium (not shown) or the like. The first receiving section 101 can be realized by communication means such as receiving means, means for reading information stored in a storage medium, or a device driver of input means such as a numeric keypad or a keyboard, for example.

The second receiving section 102 receives second read information which is acquired by reading an RFID tag located in the second region. The present embodiment deals with an example in which the second receiving section 102 receives the second read information which is read by the second tag reader/writer 14. An arrangement of the second receiving section 102 is similar to that of the first receiving section 102, and is therefore not explained repeatedly. Note that the first receiving section 101 and the second receiving section 102 may be realized by a single receiving section.

The movement direction judging section 103 judges a movement direction of an RFID tag 100 in a case where and from a fact that the first read information and the second read information indicate that a positional status of the RFID tag is changed from a status where the RFID tag 100 is present only in the first region. The "case where the first read information and the second read information indicate that the positional status of the RFID tag is changed" indicates a case where the movement direction judging section 103 judges, based on a change in the first read information and the second read information, that the positional status of the RFID tag 100 is changed. The wording "a positional status of the RFID tag is changed from a status where the RFID tag 100 is present only in the first region" indicates that (i) the positional status of the RFID tag 100 is changed from a status where the RFID tag 100 is present only in the first region to a status where the RFID tag 100 is present in the overlapping region where the first region and the second region overlap each other, (ii) the positional status of the RFID tag 100 is changed from a status where the RFID tag 100 is present only in the first region to a status where the RFID tag 100 is present only in the second region, or (iii) the positional status of the RFID tag 100 is changed from a status where the RFID tag 100 is present only in the first region to a status where the RFID tag 100 is present neither in the first region nor the second region, for example. Specifically, the movement direction judging section 103 acquires a tag ID from the first read information and the second read information. In a case where a tag ID can be acquired from the first read information, the first read information indicates that an RFID tag corresponding to the tag ID thus acquired is located in the first region. Further, in a case where a tag ID can be acquired from the second read information, the second read information indicates that an RFID tag corresponding to the tag ID thus acquired is located in the second region. The movement judging section 103 judges that an RFID tag 100 is located only in the first region in a case where only the first read information indicates that the RFID tag is present, i.e., in a case where identification information of the RFID tag 100 can be acquired only from the first read information. Meanwhile, the movement judging section 103 judges that an RFID tag 100 is located only in the second region in a case where only the second read information indicates that the RFID tag is present, i.e., in a case where identification information of the RFID tag 100 can be acquired only from the second read information. The movement direction judging section 103 judges that an RFID tag 100 is present in the overlapping region where the first region and the second region overlap each other in a case where both of the first read information and the second read information indicate that the RFID tag 100 is present, i.e., in a case where identification information of the RFID tag 100 can be acquired from both of the first read information and the second read information.

The movement direction judging section 103 judges that a movement direction of an RFID tag 100 is a direction pointing from the first region towards the second region, in a case where the first read information and the second read information indicate that the positional status of the RFID tag 100 is changed from a status where the RFID tag 100 is present only in the first region to a status where the RFID tag 100 is present only in the second region, i.e., in a case where the movement direction judging section 103 judges, based on a change in the first read information and the second read information, that the positional status of the RFID tag 100 is changed from a status where the RFID tag 100 is present only in the first region to a status where the RFID tag 100 is present only in the second region. The movement direction judging section 103 judges that the movement direction of the RFID tag 100 is a direction different from the direction pointing from the first region towards the second region (e.g. a direction pointing from the second region towards the first region), in a case where the first read information and the second read information indicate that the positional status of the RFID tag 100 is not changed from a status where the RFID tag 100 is present only in the second region within a predetermined period of time after the first read information and the second read information indicate that the positional status of the RFID tag 100 is changed from a status where the RFID tag 100 is present only in the first region to a status where the RFID tag 100 is present in the overlapping region. Note that a start point and a destination of an RFID tag 100 have nothing to do with a movement direction of the RFID tag 100. For example, even in a case where an RFID tag 100 that is located in the part of the second region which part does not overlap the first region moves in a direction opposite to a direction towards the first region, i.e., moves to an outside region of the second region, a movement direction of the RFID tag 100 is expressed as "direction pointing from the first region towards the second region".

The above description has dealt with a case where a movement direction of an RFID tag 100 is judged based on a change from a status where the RFID tag 100 is located in the part of the first region which part does not overlap the second region. Needless to say, however, it is also possible that the movement direction of the RFID tag 100 is judged based on a change from a status where the RFID tag 100 is located in the part of the second region which part does not overlap the first region. For example, the movement direction judging section 103 may judge that a movement direction of an RFID tag 100 is a direction pointing from the second region towards the first region, in a case where the first read information and the second read information indicate that the positional status of the RFID tag 100 is changed from a status where the RFID tag 100 is present only in the second region to a status where the RFID tag 100 is present only in the first region. Processing carried out by the movement direction judging section 103 is described later in detail. Normally, the movement direction judging section 103 can be realized by an MPU, a memory, or the like. The processing of the movement direction judging section 103 is normally realized by software, and the software is stored in a storage medium such as a ROM. Alternatively, the processing of the movement direction judging section 103 may be realized by hardware (dedicated circuit).

The detection frequency information acquisition section 104 acquires detection frequency information indicative of how many times first read information and/or second read information concerning the RFID tag 100 appears on the basis of plural sets of first read information and second read information which are acquired by carrying out the RFID tag reading process plural times and are then respectively received by the first receiving section 101 and the second receiving section 102. The "first read information and second read information concerning the RFID tag 100" indicates first read information and the second read information read from the RFID tag 100. Specifically, the detection frequency information acquisition section 104 counts how many times at least one of first read information and second read information which contain read information (i.e. tag ID) concerning the RFID tag 100 appears in plural sets of first read information and second read information. The detection frequency information acquisition section 104 acquires detection frequency information indicative of how many times the tag ID appears, based on a result obtained by the counting. In a case where the identification information of an identical RFID tag appears in both of the first read information and the second read information, it is considered that the identification information has appeared once. Normally, a reading process with respect to the first region is repeatedly carried out concurrently with a corresponding reading process with respect to the second region. The detection frequency information acquisition section 104 may acquire, for example, detection frequency of a logical OR of the following two conditions: (i) an RFID tag 100 appears in first read information and (ii) the RFID tag 100 appears in second read information that is read concurrently with the first read information. In a case where first read information and second read information are concurrently read, it means that the first read information and the second read information are acquired in the same reading process (e.g., n-th reading process). However, it does not necessarily mean that the first read information and the second read information are read precisely at the same time, as long as it can be recognized that the first read information and the second read information are read in the same reading process. For example, there may be a predetermined time lag between a time at which the first read information is read and a time at which the second read information is read. Specifically, the detection frequency information acquisition section 104 acquires detection frequency information indicative of how many times at least one of first read information and second read information which contains read information read from an RFID tag 100 appears in plural set of first read information and second read information, each of the plural sets including first read information and second read information which are read concurrently, which are respectively received by the first receiving section 101 and the second receiving section 102, and which are temporarily stored in a storage medium. In other words, the detection frequency information acquisition section 104 acquires detection frequency information indicative of how many times read information read from an RFID tag 100 is included in at least one of first read information and second read information. The detection frequency information may be any information which makes it possible to judge whether appearance frequency of identification information of an RFID tag 100 is high or low. For example, the detection frequency information may be information indicative of how many times at least one of first read information and second read information contains read information read from an RFID tag 100. Alternatively, the appearance frequency may be a ratio of the number of appearances of read information read from an RFID tag 100 with respect to the number of reading processes or the number of comparing processes for detecting whether the read information appears or not. For example, in a case where read information read from an RFID tag 100 is identification information of the RFID tag 100, the detection frequency information acquisition section 104 may acquire, as detection frequency information of the RFID tag 100 corresponding to the identification information, information indicative of the number of times at least one of first read information and second read information which contain the identification information appears in N sets of read information (N is an integer equal to or larger than 2). Alternatively, the detection frequency information acquisition section 104 may acquire, as the detection frequency information, a value obtained by dividing (i) the number of times at least one of first read information and second read information which contain the identification information appears in N sets of read information by (ii) N or (N−1). Normally, the detection frequency information acquisition section 104 can be realized by an MPU, a memory, or the like. Processing of the detection frequency information acquisition section 104 is normally realized by software, and the software is stored in a storage medium such as an ROM. Alternatively, the processing of the detection frequency information acquisition section 104 may be realized by hardware (dedicated circuit).

The movement judging section 105 judges, based on the detection frequency information acquired by the detection frequency information acquisition section 104, whether or not an RFID tag 100 has moved out of both of the first region and the second region. Specifically, judging "whether or not an RFID tag 100 has moved out of both of the first region and the second region" indicates that it is determined whether or not the positional status of the RFID tag 100 is changed from a status where the RFID tag 100 is located in at least one of the first region and the second region to a status where the RFID tag 100 is located neither in the first region nor in the second region. Further, judging "whether or not an RFID tag 100 has moved out of both of the first region and the second region" may be considered as judging whether or not the RFID tag 100 remains in the first region and/or the second region.

Specifically, the movement judging section 105 compares (i) a value indicated by the detection frequency information acquired by the detection frequency information acquisition section 104 and (ii) a predetermined threshold value concerning appearance frequency. In a case where the value indicated by the detection frequency information is lower than the predetermined threshold value, the movement judging section 105 judges that an RFID tag 100 corresponding to the detection frequency information has moved out of both of the first region and the second region. Such an RFID tag 100 which has moved out of both of the first region and the second region is hereinafter referred to as "moving tag". In contrast, in a case where the value indicated by the detection frequency information is higher than the predetermined value, the movement judging section 105 judges that the RFID tag 100 corresponding to the detection frequency information has not moved out of the first region and the second region. Such an RFID tag 100 which has not moved out of the first region and the second region is hereinafter referred to as "remaining tag". For example, in a case where (i) a value of detection frequency information becomes larger as appearance frequency becomes higher and (ii) the value of the detection frequency information is lower than the threshold value, the movement judging section 105 judges that an RFID tag 100 corresponding to the detection frequency information has moved out of the first region. Specifically, the movement judging section 105 judges that the RFID tag 100 has moved out of both of the first region and the second region only in a case where detection frequency information indicates that an RFID tag 100 is read once in N reading processes (N is an integer equal to or larger than 2). Note that, in this case, it is preferable that a value of N be not less than 3. Normally, the movement judging section 105 can be realized by an MPU, a memory, or the like. Processing of the movement judging section 105 is normally realized by software, and the software is stored in a storage medium such as a ROM. Alternatively, the processing of the movement judging section 105 may be realized by hardware (dedicated circuit).

The output judging section 106 judges whether or not an RFID tag 100 whose movement direction has been judged by the movement direction judging section 103 matches an RFID tag 100 which has been judged, by the movement judging section 105, to have moved out of both of the first region and the second region. Specifically, the output judging section 106 judges whether or not a tag ID of the RFID tag 100 whose movement direction has been judged by the movement direction judging section 103 matches a tag ID of the RFID tag 100 which has been judged, by the movement judging section 105, to have moved out of both of the first region and the second region. In a case where it is determined that the tag ID of the RFID tag 100 whose movement direction has been judged by the movement direction judging section 103 matches the tag ID of the RFID tag 100 which has been judged, by the movement judging section 105, to have moved out of both of the first region and the second region, the output judging section 106 acquires the tag ID as a judgment result, for example. This tag ID is the tag ID which has been thus judged to match the tag ID of the RFID tag 100 which has been judged to have moved out of both of the first region and the second region. The phrase "movement direction has been judged by the movement direction judging section 103" means that the movement direction judging section 103 has acquired a judgment result concerning the movement direction, and therefore does not include a case where no judgment result concerning the movement direction has been acquired. Normally, the output judging section 106 can be realized by an MPU, a memory, or the like. Processing of the output judging section 106 is normally realized by software, and the software is stored in a storage medium such as a ROM. Alternatively, the processing of the output judging section 106 may be realized by hardware (dedicated circuit).

The output section 107 outputs a judgment result, which is acquired by the movement direction judging section 103, concerning an RFID tag 100 which has been judged, by the output judging section 106, to match an RFID tag 100 which has been judged to have moved out of both of the first region and the second region. Specifically, the judgment result which is acquired by the movement direction judging section 103 and is outputted by the output section 107 is information indicative of a movement direction which is acquired by the movement direction judging section 103. Note, however, that such a judgment result outputted by the output section 107 may be a combination of information for identifying an RFID tag 100 and information indicative of a movement direction of the RFID tag 100, for example. Such a judgment result concerning a movement direction may be any information which allows a movement direction to be determined. For example, the output section 107 may output a result obtained by comparing a movement direction judged by the movement direction judging section 103 and a predetermined movement direction. That is, the output section 107 may output information indicating whether or not the movement direction judged by the movement direction judging section 103 matches the predetermined movement direction or may output information indicating whether or not the movement direction judged by the movement direction judging section 103 is a correct one. The term "output" as used herein includes displaying on a display device, printing on a printer, audio output, transmission to an external device, accumulation in a storage medium, and delivering of a processing result to another processing apparatus or another program. The output section 107 may include an output device such as a display device or a printer or may not include such an output device. The output section 107 can be realized by (i) driver soft of an output device or (ii) driver soft of an output device and the output device, for example.

Figures 2, 3:
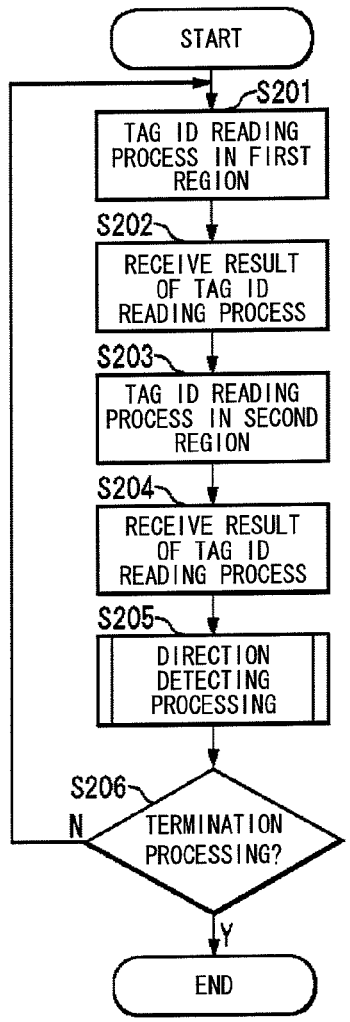
FIG. 2 is a flow chart for explaining how the tag information processing system of the embodiment operates.
FIG. 3 is a view showing a format in which read information is accumulated in the embodiment.

The following description deals with how the tag information processing system 1000 operates, with reference to a flow chart of FIG. 2.

The following description deals with an example in which read information obtained by reading an RFID tag 100 is stored, as a list having a format shown in FIG. 3, in a storage medium or the like (not shown) by the movement direction judging section 103 etc. of the tag information processing apparatus 10.

FIG. 4 is a view for explaining each item of the format shown in FIG. 3. The "TAG ID" of FIG. 3 indicates a tag ID (i.e., identification information) read from an RFID tag 100. The "F1" is information indicating whether or not a tag ID of an RFID tag 100 could be read from the first region, and "F2" is information indicating whether or not a tag ID of an RFID tag 100 could be read from the second region. That is, each of the "F1" and "F2" is a so-called flag. Note that "1" indicates that a tag ID could be read and "0" indicates that a tag ID could not be read. The "DF1" is a flag indicating whether or not a tag ID of an RFID tag 100 could be read from the first region in a previous reading process, and "DF2" is a flag indicating whether or not a tag ID of an RFID tag 100 could be read from the second region in a previous reading process. Note that "1" indicates that a tag ID could be read, and "0" indicates that a tag ID could not be read. The "TR1" is a first detection start trigger indicating that reading of an RFID tag 100 only in the first region starts. The "TR2" is a second detection start trigger indicating that the reading in the second region starts while the first detection start trigger is being on or indicating that the reading in the first region is finished. In other words, the "TR2" is a trigger indicating that a state where the reading of the RFID tag is carried out only in the first region is finished. The "TR3" is a third detection start trigger indicating that the reading only in the second region starts. The "TR4" is a fourth detection start trigger indicating that the reading in the first region starts while the third detection start trigger is being on or indicating that the reading in the second region is finished. In other words, the "TR4" is a trigger indicating that a state where the reading is carried out only in the second region is finished. A value of each of the triggers becomes 1 in a case where a change in status occurs, and becomes 0 in other cases. The "Time" indicates a period of time that has elapsed since the second detection start trigger or the fourth detection start trigger became 1. Here, a value indicative of the number of reading processes is used as the period of time that has elapsed since the second detection start trigger or the fourth detection start trigger became 1. The "RT" is a flag indicating whether or not a movement direction of an RFID tag 100 is a direction pointing from first region towards the second region. Note that "1" indicates that the movement direction is the direction pointing from the first region towards the second region, and "0" indicates that it has not yet determined that the movement direction is the direction pointing from the first region towards the second region. The "LT" is a flag indicating whether or not a movement direction of an RFID tag 100 is a direction pointing from the second region towards the first region. Note that "1" indicates that the movement direction is the direction pointing from the second region towards the first region, and "0" indicates that it has not yet determined that the movement direction is the direction pointing from the second region towards the first region. The "DR" is the last value of the "RT", and the "DL" is the last value of the "LT". The "End" is a flag indicating whether or not the processing is finished. Note that "1" indicates that the processing is finished, and "0" indicates that the processing is not finished.

(Step S201) The first tag reader/writer 12 reads information of at least one RFID tag 100 located in the first region via the first transmitting/receiving antenna 11. Specifically, in order to read identification information, the first tag reader/writer 12 gives, via the first transmitting/receiving antenna 11, an instruction which causes the at least one RFID tag 100 to supply their identification information. In response to the instruction, the at least one RFID tag 100 supplies the identification information. Then, the first tag reader/writer 12 receives the identification information via the first transmitting/receiving antenna 11. Such information read by the first tag reader/writer 12 is identification information (tag ID) of an RFID tag 100, for example.

(Step S202) The first receiving section 101 receives first read information which is the information read, in the Step S201, by the first tag reader/writer 12. The first read information is the identification information of the at least one RFID tag 100, for example. The first receiving section 101 causes the first read information thus received to be temporarily stored, as read information whose reading order (number) is expressed by 1, in a storage medium (not shown) such as a memory.

(Step S203) The second tag reader/writer 14 reads information of at least one RFID tag 100 located in the second region via the second transmitting/receiving antenna 13, similar to the first tag reader/writer 12.

(Step S204) The second receiving section 102 receives second read information which is information read, in the Step S203, by the second tag reader/writer 14. The second read information is information similar to the first read information. The second receiving section 102 causes the second read information thus received to be temporarily stored, as read information whose reading order (number) is expressed by 1, in a storage medium (not shown) such as a memory.

(Step S205) The tag information processing apparatus 10 carries out processing in which a movement direction of an RFID tag 100 is detected. This is described later in detail.

(Step S206) The tag information processing apparatus 10 judges whether the reading process is terminated or not. For example, the tag information processing apparatus 10 judges, based on a predetermined trigger, whether the reading process is terminated or not. For example, in a case where a termination instruction receiving section (not shown) or the like receives an instruction to terminate the process, the tag information processing apparatus 10 judges that the reading process is terminated. In a case where tag information processing apparatus 10 judges that the reading process is terminated, the reading process is terminated. In contrast, in a case where the tag information processing apparatus 10 judges that the reading process is not terminated, the process in the Step S201 is carried out again.

In the flow chart of FIG. 2, the reading process is terminated when the power is turned off or when an interrupt for terminating the process is generated.

Figure 5:
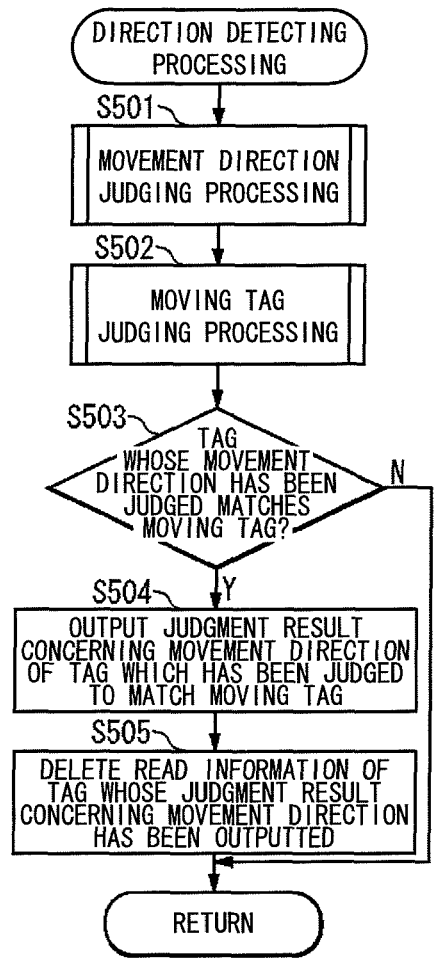
FIG. 5 is a flow chart for explaining how the tag information processing system of the embodiment operates.

The following description deals with movement direction detecting processing of the tag information processing apparatus 10 with reference to the flow chart of FIG. 5. This processing corresponds to the processing in the Step S205 of FIG. 2.

(Step S501) The tag information processing apparatus 10 judges a movement direction of an RFID tag 100 on the basis of the first read information and the second read information which are received by the first receiving section 101 and the second receiving section 102, respectively. This is described later in detail.

(Step S502) The tag information processing apparatus 10 judges whether or not an RFID tag 100 has moved out of both of the first region and the second region (i.e., whether or not the RFID tag 100 is a moving tag), on the basis of plural sets of first read information and second read information received by the first receiving section 101 and the second receiving section 102, respectively. This is described below in detail.

(Step S503) The output judging section 106 judges whether or not the RFID tag 100 whose movement direction has been judged in the Step S501 matches any one of RFID tags 100 that have been judged as moving tags in the Step S502. In a case where the output judging section 106 judges that the RFID tag 100 whose movement direction has been judged matches any of the RFID tags 100 that have been judged as moving tags, a process in the Step S504 is carried out. Meanwhile, in a case where the output judging section 106 judges that the RFID tag 100 whose movement direction has been judged does not match any of the RFID tags 100 that have been judged as moving tags, the process returns to the main flow of the process.

(Step S504) The output section 107 outputs a judgment result concerning the movement direction of the RFID tag 100 which is judged, in the Step S503, to match any one of the RFID tags 100 that have been judged as moving tags. The output section 107 may output a combination of (i) a tag ID of a moving RFID tag 100 and (ii) information indicative of a movement direction of the RFID tag 100, for example.

(Step S505) The tag information processing apparatus 10 deletes, from read information accumulated in a storage medium (not shown), for example, as a list shown in FIG. 3, read information (i.e., first read information and second read information) of the RFID tag 100 whose judgment result concerning the movement direction has been outputted in the Step S504. Then, the process returns to the main flow of the process.

Figure 6:
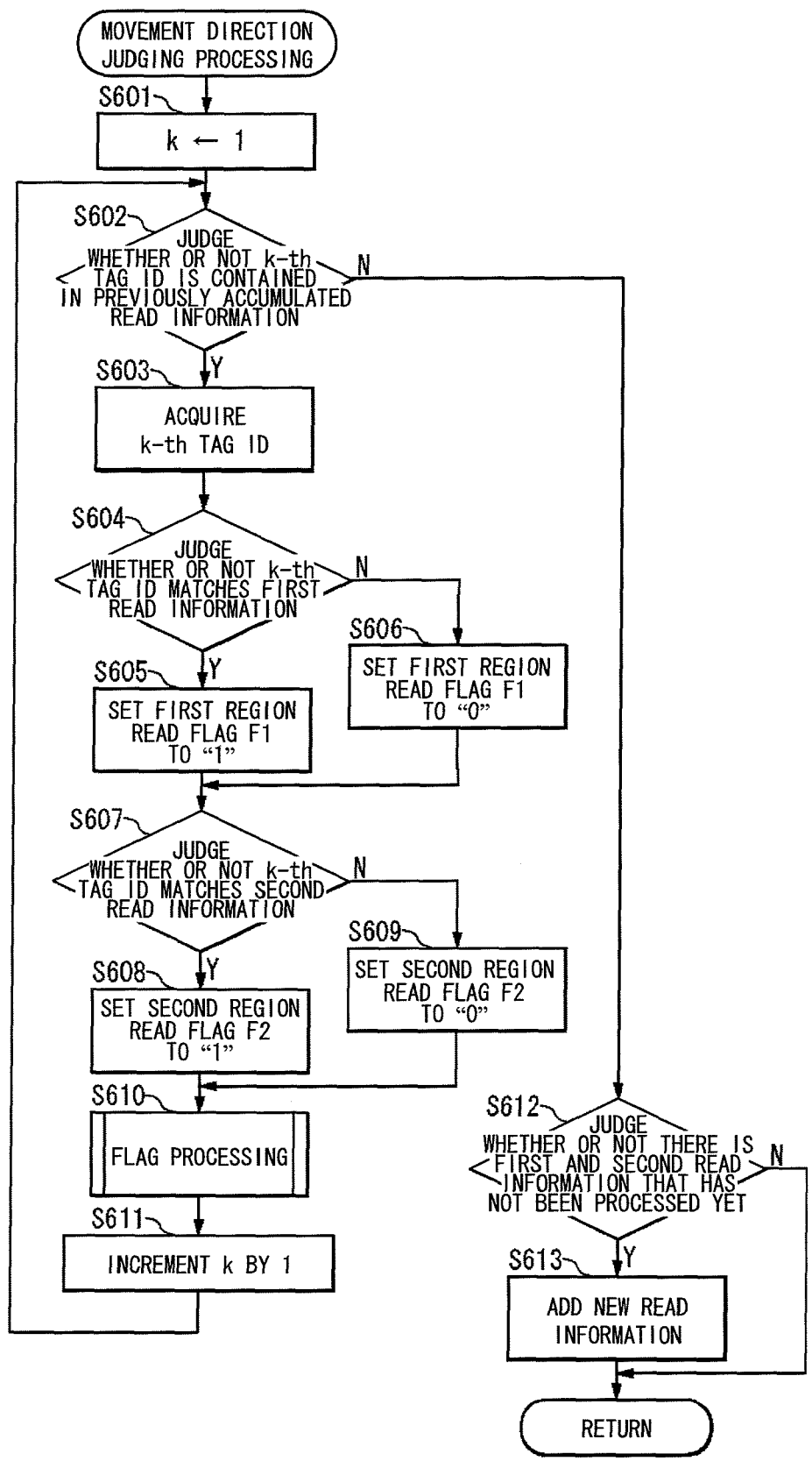
FIG. 6 is a flow chart for explaining how the tag information processing system of the embodiment operates.

The following description deals with the movement direction judging processing of the tag information processing apparatus 10 in detail with reference to the flow chart of FIG. 6. Note that this processing corresponds to the processing in the Step S501 of FIG. 5.

(Step S601) The movement direction judging section 103 assigns 1 to a value of a counter K.

(Step S602) The movement direction judging section 103 judges whether or not a K-th tag ID is contained in read information previously accumulated in the storage medium (not shown). The read information previously accumulated in the storage medium refers to first read information and second read information accumulated, in the format shown in FIG. 3, in the storage medium (not shown) before the read information received this time by the first receiving section 101 and the second receiving section 102 is accumulated. Since it can be estimated that the K-th tag ID is included in K-th read information, the movement direction judging section 103 may judge whether or not the K-th read information is contained in the read information accumulated, for example, as a list having the format shown in FIG. 3. In a case where the K-th tag ID is contained in the read information accumulated in the storage medium, a process in the Step S603 is carried out. Meanwhile, in a case where the K-th tag ID is not contained in the read information accumulated in the storage medium, a process in the Step S612 is carried out.

(Step S603) The movement direction judging section 103 acquires a tag ID contained in the K-th read information (i.e., the K-th tag ID) from among read information previously accumulated in the storage medium (not shown).

(Step S604) The movement direction judging section 103 judges whether or not the K-th tag ID matches a tag ID of any one of first read information (i.e., read information obtained by reading the first region) received by the first receiving section 101. Note that in a case where read information is a tag ID, the movement direction judging section 103 only has to compare the K-th tag ID with the read information. In a case where the K-th tag ID matches any one of the first read information, a process in the Step S605 is carried out. Meanwhile, in a case where the K-th tag ID does not match any of the first read information, a process in the Step S606 is carried out.

(Step S605) The movement direction judging section 103 causes a value of the first region read flag F1 of the K-th read information to be "1". That is, the movement direction judging section 103 gives the K-th tag ID information indicating that an RFID tag 100 corresponding to the K-th tag ID is located in the first region. Then, a process in the Step S607 is carried out.

(Step S606) The movement direction judging section 103 causes a value of the first region read flag F1 of the K-th read information to be "0". That is, the movement direction judging section 103 gives the K-th tag ID information indicating that the RFID tag 100 corresponding to the K-th tag ID is not located in the first region. Then, the process in the Step S607 is carried out.

(Step S607) The movement direction judging section 103 judges whether or not the K-th tag ID matches a tag ID of any one of second read information (i.e., read information obtained by reading the second region) received by the second receiving section 102. In a case where the K-th tag ID matches any one of the second read information, a process in the Step S608 is carried out. Meanwhile, in a case where the K-th tag ID does not match any one of the second read information, a process in the Step S609 is carried out.

(Step S608) The movement direction judging section 103 causes a value of the second region read flag F2 of the K-th read information to be "1". That is, the movement direction judging section 103 gives the K-th tag ID information indicating that the RFID tag 100 corresponding to the K-th tag ID is located in the second region. Then, a process in the Step S610 is carried out.

(Step S609) The movement direction judging section 103 causes the value of the second region read flag F2 of the K-th read information to be "0". That is, the movement direction judging section 103 gives the K-th tag ID information indicating that the RFID tag 100 corresponding to the K-th tag ID is not located in the second region. Then, the process in the Step S610 is carried out.

(Step S610) The movement direction judging section 103 carries out flag processing. The flag processing can be summarized as follows. The flag processing is such that (i) flags indicative of how location of an RFID tag 100 is changed are changed in accordance with (a) a combination of the flags F1 and F2 which are indicative of the location of the RFID tag 100 and whose values are determined in the Step S605, the Step S606, the Step S608, and the Step S609 and (b) a temporal change in values of the flags F1 and F2, and (ii) a provisional movement direction of the RFID tag 100 is detected based on the change of the flags and an elapsed period of time. The flag processing is processing in which a flag is given a value indicating that an RFID tag 100 has moved in the direction pointing from the first region towards the second region, in a case where a combination of flag values which are set based on a result obtained by reading the RFID tag 100 indicates that a positional status of the RFID tag 100 is changed to a status where the RFID tag 100 is read only in the second region within a predetermined period of time (shown in threshold value) after indicating that the positional status of the RFID tag 100 is changed from a status where the RFID tag 100 is read only in the first region to a status where the RFID tag 100 is read in the overlapping region where the first region and the second region overlap each other. Further, the flag processing is processing in which a flag is given a value indicating that an RFID tag 100 has moved in a direction opposite to the direction pointing from the first region towards the second region (i.e., in a direction pointing from the second region towards the first region), in a case where a predetermined period of time (shown in threshold value) has elapsed after a combination of flag values indicates that the positional status of the RFID tag 100 is changed from a status where the RFID tag 100 is read only in the first region to a status where the RFID tag 100 is read in the overlapping region where the first region and the second region overlap each other. In the above description, the terms "first region" and "second region" can be replaced by the terms "second region" and "first region", respectively. The flag processing is described later in detail.

(Step S611) The movement direction judging section 103 increments the counter K by 1. Then, the process in the Step S602 is carried out again.

(Step S612) The movement direction judging section 103 judges whether or not the first read information and the second read information received this time by the first receiving section 101 and the second receiving section 102 respectively have read information that has not been processed in at least one of Step S604 and Step S605, i.e., have first read information and second read information which have not been judged as to whether a tag ID which matches the K-th tag ID is contained or not. In a case where the first read information and the second read information have not been processed yet, a process in the Step S613 is carried out. Meanwhile, in a case where the first read information and the second read information have been processed, the process returns to the main flow of the process.

(Step S613) The movement direction judging section 103 causes the first read information and the second read information that have been judged, in the Step S612, to have not been processed yet to be stored in the storage medium (not shown) or the like as new read information as a list having items as shown in FIG. 3. Then, the process returns to the main flow of the process.

Figure 7:
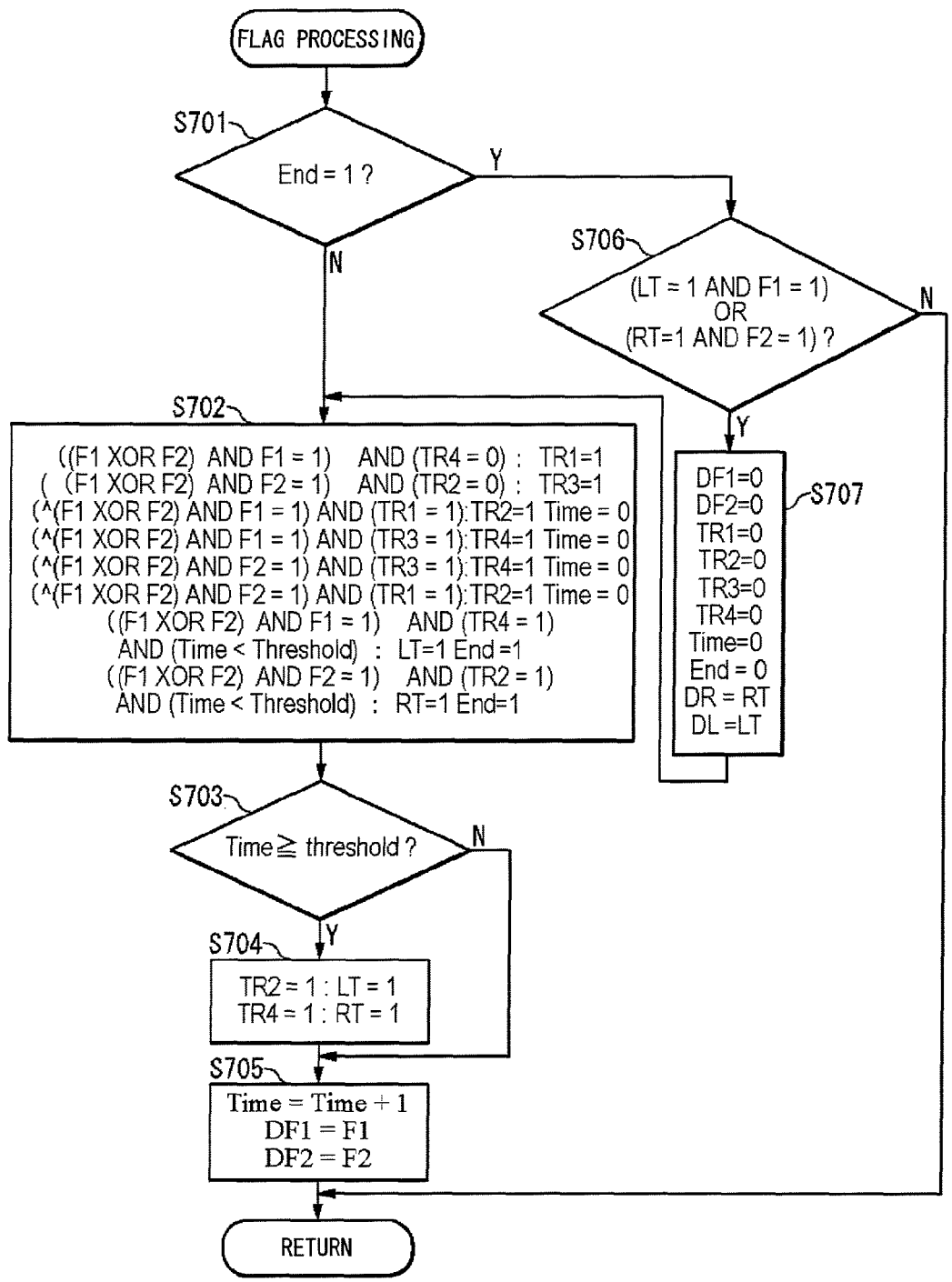
FIG. 7 is a flow chart for explaining how the tag information processing system of the embodiment operates.

The following description deals with the flag processing in the Step S610 of the flow chart of FIG. 3 in detail with reference to the flow chart of FIG. 7. The flag processing is processing for setting or changing a value of an item in the list shown in FIG. 3. Note that, in FIG. 7, a character string at the left of ":" indicates a condition, and a character string at the right of ":" indicates a process to be executed. For example, "X:Y" indicates "in the case of X, Y is carried out". Note also that "^" is a symbol for expressing negation. Specifically, "^X" indicates "not X".

(Step S701) The movement direction judging section 103 judges whether the flag End is "1" or not. In a case where the flag End is "1", a process in the Step S702 is carried out. Meanwhile, in a case where the flag End is not "1", a process in the Step S703 is carried out.

(Step S702) The movement direction judging section 103 makes the following judgments.

(1) In a case where (i) a logical AND of (a) exclusive logical OR of the flags F1 and F2 and (b) the flag F1 is "1" and (ii) the trigger TR4 is "0", the trigger TR1 is set to "1". Specifically, it is determined that an RFID tag 100 has entered into the part of the first region which part does not overlap the second region in a case where (i) the RFID tag 100 was detected in the part of the first region which part does not overlap the second region and (ii) the trigger TR4, which indicates that the RFID tag 100 had moved from the part of the second region which part does not overlap the first region to the overlapping region before the RFID tag 100 was detected in the part of the first region which part does not overlap the second region, is not "1", i.e., entry of the RFID tag 100 into the overlapping region is not detected.

(2) In a case where (i) a logical AND of (a) exclusive logical OR of the flags F1 and F2 and (b) the flag F2 is "1" and (ii) the trigger TR2 is "0", the trigger TR3 is set to "1". Specifically, it is determined that an RFID tag 100 has entered into the part of the second region which part does not overlap the first region in a case where (i) the RFID tag 100 was detected in the part of the second region which part does not overlap the first region and (ii) the trigger TR4, which indicates that the RFID tag 100 had moved from the part of the first region which part does not overlap the second region to the overlapping region before the RFID tag 100 was detected in the part of the second region which part does not overlap the first region, is not "1", i.e., entry of the RFID tag 100 into the overlapping region is not detected.

(3) In a case where (i) a logical AND of (a) negation of exclusive logical OR of the flags F1 and F2 and (b) the flag F1 is "1" and (ii) the trigger TR1 is "1", the trigger TR 2 is set to "1" and the Time is set to "0". Specifically, it is determined that an RFID tag 100 has moved from the part of the first region which part does not overlap the second region to the overlapping region, in a case where (i) the RFID tag 100 was detected in the overlapping region and (ii) the RFID tag 100 had been detected in the part of the first region which part does not overlap the second region before the RFID tag 100 was detected in the overlapping region. Moreover, the elapsed period of time is set to "0".

(4) In a case where (i) a logical AND of (a) negation of exclusive logical OR of the flags F1 and F2 and (b) the flag F1 is "1" and (ii) the trigger TR3 is "1", the trigger TR4 is set to "1" and the Time is set to "0". Specifically, it is determined that an RFID tag 100 has moved from the part of the second region which part does not overlap the first region to the overlapping region, in a case where (i) the RFID tag 100 was detected in the overlapping region and (ii) the RFID tag 100 had been detected in the part of the second region which part does not overlap the first region before the RFID tag 100 was detected in the overlapping region. Moreover, the elapsed period of time is set to "0".

(5) In a case where (i) a logical AND of (a) negation of exclusive logical OR of the flags F1 and F2 and (b) the flag F2 is "1" and (ii) the trigger TR3 is "1", the trigger TR4 is set to "1" and the Time is set to "0". Specifically, it is determined that an RFID tag 100 has moved from the part of the second region which part does not overlap the first region to the overlapping region, in a case where (i) the RFID tag 100 was detected in the overlapping region and (ii) the RFID tag 100 had been detected in the part of the second region which part does not overlap the first region before the RFID tag 100 was detected in the overlapping region. Moreover, the elapsed period of time is set to "0". Note that this process may be omitted since this process produces the same result as the process in (4).

(6) In a case where (i) a logical AND of (a) negation of exclusive logical OR of the flags F1 and F2 and (b) the flag F2 is "1" and (ii) the trigger TR1 is "1", the trigger TR2 is set to "1" and the Time is set to "0". Specifically, it is determined that an RFID tag 100 has moved from the part of the first region which part does not overlap the second region to the overlapping region, in a case where (i) the RFID tag 100 was detected in the overlapping region and (ii) the RFID tag 100 had been detected in the part of the first region which part does not overlap the second region before the RFID tag 100 was detected in the overlapping region. Moreover, the elapsed period of time is set to "0". Note that this process may be omitted since this process produces the same result as the process in (3).

(7) In a case where (i) a logical AND of (a) negation of exclusive logical OR of the flags F1 and F2 and (b) the flag F1 is "1", (ii) the trigger TR4 is "1", and (iii) the Time is smaller than a predetermined threshold value, the flag LT is set to "1" and the flag End is set to "1". Specifically, it is determined that an RFID tag 100 has moved in a direction pointing from the second region towards the first region, in a case where (i) the RFID tag 100 was detected in the part of the first region which part does not overlap the second region, (ii) entry of the RFID tag 100 from the second region into the overlapping region had been detected before the RFID tag 100 was detected in the part of the first region which part does not overlap the second region, and (iii) the elapsed period of time is shorter than a predetermined period of time (threshold value).

(8) In a case where (i) a logical AND of (a) negation of exclusive logical OR of the flags F1 and F2 and (b) the flag F2 is "1", (ii) the trigger TR2 is "1", and (iii) the Time is smaller than a predetermined threshold value, the flag RT is set to "1" and the flag End is set to "1". Specifically, it is determined that an RFID tag 100 has moved in a direction pointing from the first region towards the second region, in a case where (i) the RFID tag 100 was detected in the part of the second region which part does not overlap the first region, (ii) entry of the RFID tag 100 from the first region into the overlapping region had been detected before the RFID tag 100 was detected in the part of the second region which part does not overlap the first region, and (iii) the elapsed period of time is shorter than a predetermined period of time (threshold value).

(Step S703) The movement direction judging section 103 judges whether or not the Time is not less than a predetermined threshold value. In a case where the Time is not less than the predetermined threshold value, a process in the Step S704 is carried out. Meanwhile, in a case where the Time is smaller than the predetermined threshold value, a process in the Step S705 is carried out.

(Step S704) In a case where the trigger TR2 is "1", the movement direction judging section 103 causes the flag LT to be "1". Specifically, it is determined that an RFID tag 100 has moved in a direction pointing from the second region towards the first region, in a case where a period of time elapsed since entry of the RFID tag 100 from the first region to the overlapping region was detected is not less than a predetermined period of time (threshold value). Further, in a case where the trigger TR4 is "1", the movement direction judging section 103 causes the flag RT to be "1". Specifically, it is determined that an RFID tag 100 has moved in a direction pointing from the first region towards the second region, in a case where a period of time elapsed since entry of the RFID tag 100 from the second region to the overlapping region was detected is not less than a predetermined period of time (threshold value).

(Step S705) The movement direction judging section 103 increments a value of the Time by 1. Note that the Time refers to the number of reading processes. Further, the movement direction judging section 103 assigns a value of the flag F1 to the flag DF1, and assigns a value of the flag F2 to the flag DF2. Then, the process returns to the main flow of the process.

(Step S706) The movement direction judging section 103 judges whether at least one of (i) a condition that the flag LT=1 and the flag F1=1 and (ii) a condition that the flag RT=1 and the flag F2=1 is satisfied or not. In a case where at least one of (i) the condition that the flag LT=1 and the flag F1=1 and (ii) the condition that the flag RT=1 and the flag F2=1 is satisfied, a process in the Step S707 is carried out. Meanwhile, in a case where neither (i) the condition that the flag LT=1 and the flag F1=1 nor (ii) the condition that the flag RT=1 and the flag F2=1 is satisfied, the process returns to the main flow of the process.

(Step S707) The movement direction judging section 103 sets the flag DF1 to "0", sets the triggers TR1 to TR4 to "0", sets the Time to "0", and sets the End to "0". Further, the movement direction judging section 103 assigns a value of the flag RT for a value of the flag DR, and assigns a value of the flag LT to the flag DL. Then, the process in the Step S702 is carried out again.

Figure 8:
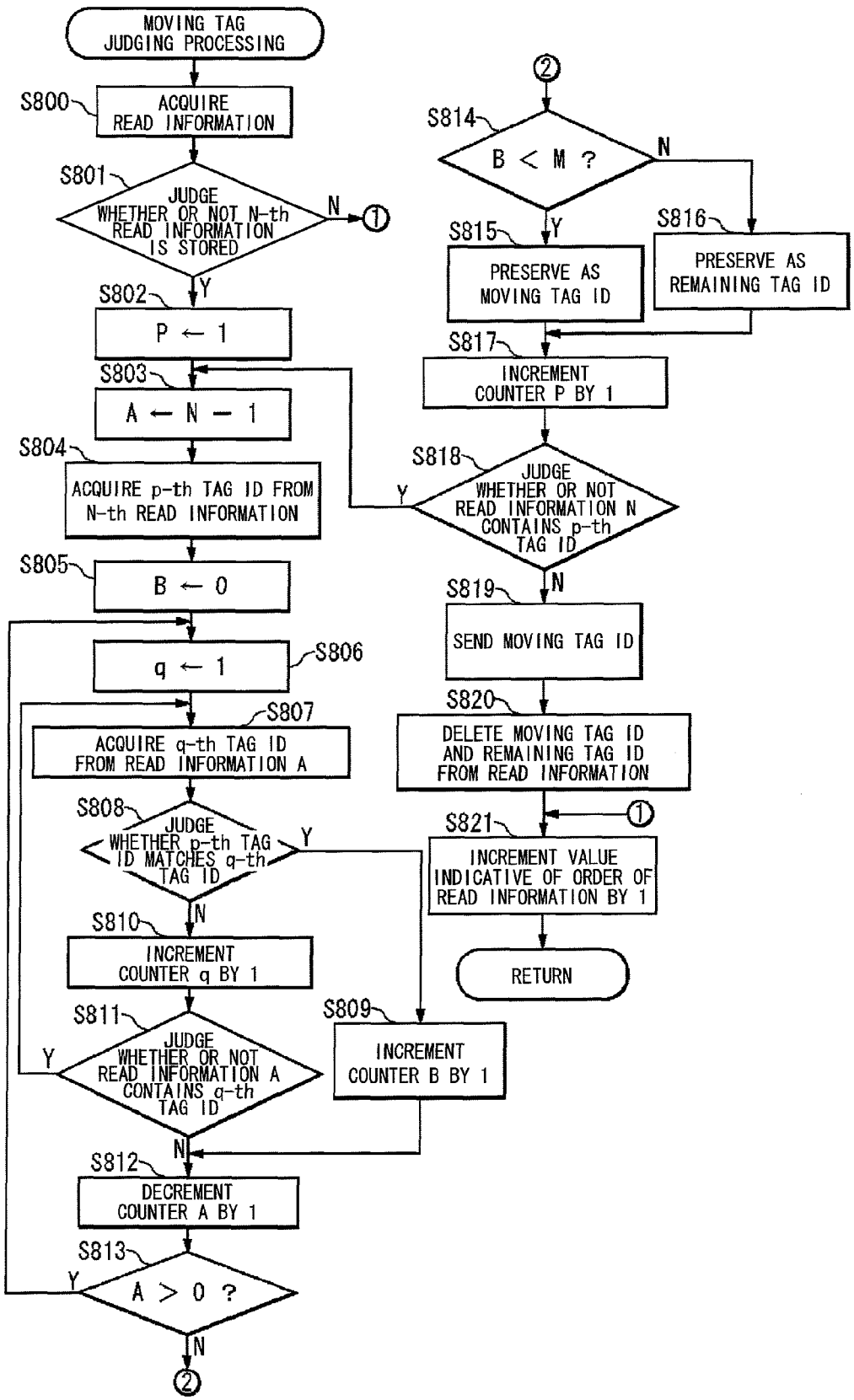
FIG. 8 is a flow chart for explaining how the tag information processing system of the embodiment operates.

The following description deals with moving tag judging processing with reference to the flow chart of FIG. 8. The moving tag judging processing corresponds to the process in the Step S502 (see FIG. 5). Note that the following description deals with an example in which (i) the detection frequency information acquisition section 104 acquires detection frequency information concerning an RFID tag 100 whose information is read in the oldest reading process of N reading processes (N is an integer equal to or larger than 2), and (ii) the movement judging section 105 judges, based on the detection frequency information thus acquired, whether or not the RFID tag has moved out of the first region. Here, the number of reading processes for judging whether or not the RFID tag 100 is a moving tag is N (N is an integer equal to or larger than 2). It is assumed that the detection frequency information is information indicative of how many times the RFID tag 100 which is read in the oldest reading process is read (appears) again in the following (N−1) reading processes. It is also assumed that a threshold value for judging whether or not the RFID tag 100 has moved out of the first region is M (M is an integer in a range from not less than 1 to less than N). As an alternative of the above method, it is also possible that the number of appearances including appearance in the oldest reading process (i.e., how may times the RFID tag 100 appears in the N reading processes) is compared with a threshold value set in consideration of the appearance in the oldest reading process.

(Step S800) The detection frequency information acquisition section 104 acquires first read information and second read information received by the first receiving section 101 and the second receiving section 102, respectively. The detection frequency information acquisition section 104 causes the first read information and the second read information thus acquired to be temporarily stored, as read information whose reading order (number) is expressed by 1, in a storage medium (not shown) such as a memory. Here, it is determined whether or not a tag ID of the first read information matches a tag ID of the second read information, and in a case where it is determined that the tag ID of the first read information matches the tag ID of the second read information, only any one of the first read information and the second read information is temporarily stored.

(Step S801) The detection frequency information acquisition section 104 judges whether or not read information whose reading order (number) is expressed by N (hereinafter referred to as "read information N") is stored in the storage medium (not shown) in which read information is temporarily stored. That is, the detection frequency information acquisition section 104 judges whether or not N successive sets of read information are stored. In a case where N sets of read information are stored, a process in the Step S802 is carried out. Meanwhile, in a case where N sets of read information are not stored, a process in the Step S821 is carried out.

(Step S802) The detection frequency information acquisition section 104 assigns 1 to a counter p.

(Step S803) The detection frequency information acquisition section 104 assigns (N−1) to a counter A. The counter A is a counter for determining which read information among first through (N−1)th read information is to be processed. For example, in a case where 1 is assigned to the counter A, read information whose reading order (number) is expressed by 1 is specified by the counter A. Note that read information specified by the counter A is hereinafter referred to as "read information A".

(Step S804) The detection frequency information acquisition section 104 acquires a tag ID of a p-th RFID tag 100 from the read information N which is N-th read information. Note that first read information and second read information are collectively referred to as "read information", as described above. Note also that in a case where a tag ID of first read information matches that of second read information, any one of the first read information and the second read information is stored as read information.

(Step S805) The detection frequency information acquisition section 104 assigns 0 to a counter B. The counter B is a counter for counting how many time the tag ID acquired in the Step S805 appears in the first through (N1)th read information. In a case where the counter B counts how many times the tag ID appears in the first through N-th read information, 1 is assigned to the counter B in this step. In this case, the threshold value M is also increased by 1. Alternatively, it is determined, in the Step S814, whether or not the value of the counter B is not more than the threshold value M.

(Step S806) The detection frequency information acquisition section 104 assigns 1 to a counter q.

(Step S807) The detection frequency information acquisition section 104 acquires a q-th tag ID from the read information A.

(Step S808) The detection frequency information acquisition section 104 compares the p-th tag ID of the read information N which is acquired in the Step S804 with the q-th tag ID of the read information A which is acquired in the Step S807 so as to judge whether the p-th tag ID matches the q-th tag ID. In a case where the p-th tag ID of the read information N matches the q-th tag ID of the read information A, a process in the Step S809 is carried out. Meanwhile, in a case where the p-th tag ID of the read information N does not match the q-th tag ID of the read information A, a process in the Step S810 is carried out.

(Step S809) The detection frequency information acquisition section 104 increments the counter B by 1. Then, a process in the Step S812 is carried out.

(Step S810) The detection frequency information acquisition section 104 increments the counter q by 1. Then, a process in the Step S811 is carried out.

(Step S811) The detection frequency information acquisition section 104 judges whether or not the read information A contains the q-th tag ID. In a case where the read information A contains the q-th tag ID, the process in the Step S807 is carried out again. Meanwhile, in a case where the read information does not contain the q-th tag ID, the process in the Step S812 is carried out.

(Step S812) The detection frequency information acquisition section 104 decrements the counter A by 1.

(Step S813) The detection frequency information acquisition section 104 judges whether or not the value of the counter A is larger than 0. In a case the value of the counter A is larger than 0, the process in the Step S806 is carried out again. Meanwhile, in a case where the value of the counter A is not more than 0, a process in the Step S814 is carried out. A value of the counter B obtained when the process in the Step S814 is carried out is detection frequency information of an RFID tag 100 corresponding to the tag ID acquired in the Step S804.

(Step S814) The movement judging section 105 judges whether or not the value of the counter B is smaller than the threshold value M. In a case where the value of the counter B is smaller than the threshold value M, a process in the Step S315 is carried out. Meanwhile, in a case where the value of the counter B is not less than the threshold value M, a process in the Step S316 is carried out.

(Step S815) The movement judging section 105 judges that the tag ID acquired in the Step S804 is a tag ID of a moving tag which has moved out of the first region, and then preserves the tag ID as a moving tag ID (i.e., ID of a moving tag). Then, a process in the Step S817 is carried out.

(Step S816) The movement judging section 105 judges that the tag ID acquired in the Step S804 is identification information of a remaining tag which is remaining in the first region, and then preserves the tag ID as a remaining tag ID (i.e., ID of a remaining tag). Then, the process in the Step S817 is carried out.

(Step S817) The detection frequency information acquisition section 104 increments the counter p by 1.

(Step S818) The detection frequency information acquisition section 104 judges whether or not the read information N contains the p-th tag ID. In a case where the read information N contains the p-th tag ID, the process in the Step S803 is carried out again. Meanwhile, in a case where the read information N does not contain the p-th tag ID, a process in the Step S819 is carried out.

(Step S819) The movement judging section 105 causes the moving tag ID acquired in the Step S815 to be stored in the storage medium (not shown) or the like. Alternatively, the movement judging section 105 may output the moving tag ID, for example, to the output section 107.

(Step S820) The detection frequency information acquisition section 104 deletes, from the read information accumulated in the storage medium (not shown), a tag ID which matches the moving tag ID acquired in the Step S815 and a tag ID which matches the remaining tag ID acquired in the Step S816. Since a tag ID of an RFID tag 100 that has been subjected to the moving tag judging processing is deleted from the read information acquired by carrying out N reading processes, it becomes unnecessary for the detection frequency information acquisition section 104 and the movement judging section 105 to carry out the moving tag judging processing with respect to such an RFID tag again in the subsequent (N−1) moving tag judging processing. Instead of deleting such tag IDs, a moving tag ID and a remaining tag ID may be added to a list of tag IDs which need not to be subjected to the moving tag judging processing. In this case, before a tag ID is acquired in the Step S804, the tag ID is compared with the tag IDs included in the list, and in a case where it is determined that the tag ID matches any one of the tag IDs in the list, the tag ID is not acquired the predetermined number of times or for a predetermined period of time so that processing in which detection frequency information is acquired and processing in which whether or not an RFID tag 100 has moved out of the first region is judged are not carried out, i.e., are not repeated. It is assumed that the predetermined number of times indicates the predetermined fixed or unfixed number of times and the predetermined period of time indicates a predetermined fixed or unfixed period of time.

(Step S821) The detection frequency information acquisition section 104 increments a value indicative of the reading order (number) by 1 in all of the read information temporarily stored, in the Step S800, in the storage medium (not shown) such as a memory. Accordingly, in a case where the value indicative of the reading order is 1, the value is shifted from 1 to 2, and in a case where the value indicative of the reading order is (N−1), the value is shifted from (N−1) to N, for example. That is, in this flow chart, the older read information becomes in the reading order, the larger the value indicative of the reading order becomes. Note that it is unnecessary to actually assign the value indicative of the reading order to each read information temporarily stored in the memory, provided that the value indicative of the reading order of each of the read information can be identified. For example, it is possible that (i) a ring buffer in which n sets of read information can be stored is used as the storage medium, and (ii) in a case where read information is newly accumulated in the Step S203, the order in which the read information in the ring buffer is stored is shifted. Then, the process returns to the main flow of the process.

Figure 9:
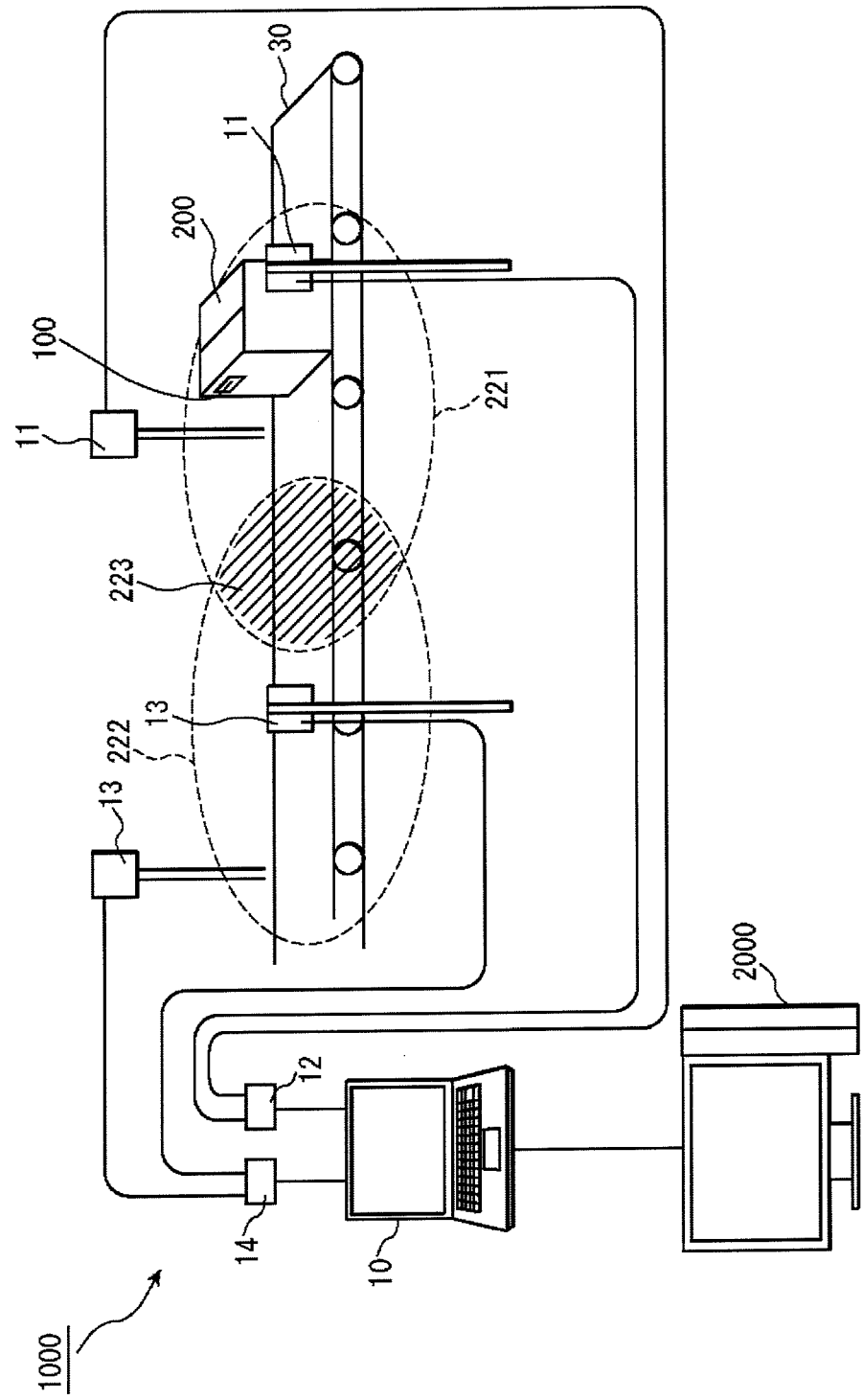
FIG. 9 is a conceptual diagram showing the tag information processing system of the embodiment.

The following description deals with how a tag information processing system of the present embodiment actually operates. FIG. 9 is a conceptual diagram illustrating the tag information processing system. The following description deals with an example in which management of transportation of packed products in a factory is carried out with the use of the tag information processing system 1000. An RFID tag 100 having identification information is attached to a packed product 200. The first transmitting/receiving antenna 11 and the second transmitting/receiving antenna 13 are disposed along a conveyer belt 30 on which products are carried. It is assumed that each of the first transmitting/receiving antenna 11 and the second transmitting/receiving antenna 13 includes two antennas so that sides for transmitting and receiving radio waves face each other, the two antennas being provided on both sides of the conveyer belt 30, respectively. It is assumed that the product 200 is carried on the conveyer belt 30 from a first region 221, which is a region read by the first transmitting/receiving antenna 11, towards a second region 222, which is a region read by the second transmitting/receiving antenna 13. It is assumed that the first region 221 and the second region 222 have an overlapping region 223 in which the first region 221 and the second region 222 overlap each other. It is assumed that the tag information processing system 1000 is connected, via network etc., to an information processing apparatus 2000 including a database in which transported RFID tags 100 are managed. It is assumed that the first region 221 is a region over which radio waves sent from the first transmitting/receiving antenna 11 can spread. It is assumed that a tag ID of the RFID tag 100 is "T201".

It is assumed that first, the tag information processing system 1000 repeatedly carries out a tag ID reading process with respect to the first region 221 and the second region 222 at predetermined timings. It is also assumed that read information read from the RFID tag 100 is a tag ID.

In a case where the product 200 is transported on the conveyer belt 30 to the first region 221, only the first tag reader/writer 12 reads the tag ID "T201" of the RFID tag 100. The first receiving section 101 of the tag information processing apparatus 10 receives the tag ID "T201". The first receiving section 101 is in such a state that it receives no tag ID, before receiving this tag ID. Therefore, the movement direction judging section 103 judges that this tag ID is new read information, and then causes the tag ID to be stored in a storage medium (not shown).

FIG. 10 is a tag ID management table in which tag IDs accumulated by the movement direction judging section 103 are managed. Here, the tag IDs are managed in the format shown in FIG. 3. It is assumed that an initial value of each item is set to 0.

The tag information processing system 1000 carries out (i) the moving tag judging processing in which it is determined whether a received tag ID is a moving tag or not and (ii) processing in which it is determined whether a judgment result of the movement direction judging section 103 is outputted or not. First, movement direction judging processing is described. A specific example of processing such as the processing in which it is determined whether a received tag ID is a moving tag or not is described later.

As a result of carrying out a next reading process with respect to the first region 221 and the second region 222, only the second tag reader/writer 12 reads the tag ID "T201" of the RFID tag 100 once again. The information thus read by the first tag reader/writer 12 is received by the first receiving section 101. Since at least one tag ID is accumulated (see the tag ID management table of FIG. 10) in the storage medium before this tag ID is received, the movement direction judging section 103 reads out the tag ID accumulated in the storage medium. Then, the movement direction judging section 103 judges whether or not the tag ID (first read information) acquired this time by the first tag reader/writer 12 matches the tag ID accumulated in the storage medium. Since both of (i) the tag ID acquired by the first tag reader/writer 12 and (ii) the tag ID accumulated in the storage medium are "T201", the movement direction judging section judges that the tag ID acquired by the first tag reader/writer 12 matches the tag ID accumulated in the storage medium. In response to this, a value of the flag "F1" of a record whose tag ID is the tag ID "T201" is set to "1" in the tag ID management table shown in FIG. 10. Subsequently, it is determined whether or not a tag ID (second read information) acquired by the second tag reader/writer 14 matches the tag ID accumulated in the storage medium. Since no tag ID is acquired by the second tag reader/writer 14, there is no second read information which matches the tag ID accumulated in the storage medium. Then, a value of the flag "F2" of a record whose tag ID is the tag ID "T201" is set to "0".

Next, the movement direction judging section 103 carries out the flag processing. Specifically, a value of the trigger TR1 of the tag ID "T201" is set to "1" since the End is "0", exclusive logical OR of the flag F1 and the flag F2 is "1", the value of the flag F1 is "1", and a value of the trigger TR4 is "0". Then, it is determined whether or not a value of the Time is larger than a threshold value. In a case where the threshold value is "5", it is determined that the value of the Time is smaller than the threshold value. Then, the value of the Time is incremented by 1 (i.e., the value of the Time is set to "1"), and a value of the flag DF1 is set to be the same as that of the flag F1, i.e., set to "1". FIG. 11 shows the tag ID management table thus changed.

Since no tag ID other than the tag ID "T201" is read in this case, the movement direction judging processing is finished.

In a case where the product 200 is moved so that the RFID tag 100 is moved to the overlapping region 223, both of the first tag reader/writer 12 and the second tag reader/writer 14 read the tag ID "T201" of the RFID tag 100. The information thus read by the first tag reader/writer 12 is received by the first receiving section 101 and the information thus read by the second tag reader/writer 14 is received by the second receiving section 102.

Since at least one tag ID has been accumulated in the storage medium (see the tag ID management table of FIG. 10) before this tag ID "T201" is received, the movement direction judging section 103 reads out the tag ID accumulated in the storage medium. Then, the movement direction judging section 103 judges whether or not the tag ID (first read information) acquired this time by the first tag reader/writer 12 matches the tag ID accumulated in the storage medium. Since both of the tag ID acquired by the first tag reader/writer 12 and the tag ID accumulated in the storage medium is "T201", it is determined that the tag ID acquired by the first tag reader/writer 12 matches the tag ID accumulated in the storage medium. In response to this, a value of the flag "F1" of a record whose tag ID is the tag ID "T201" is set to "1" in the tag ID management table shown in FIG. 10. Subsequently, the movement direction judging section 103 judges whether or not the tag ID (second read information) acquired this time by the second tag reader/writer 14 matches the tag ID accumulated in the storage medium. Since the tag ID read by the second tag reader/writer 14 is also the tag ID "T201", it is determined that the tag ID acquired by the second tag reader/writer 14 matches the tag ID accumulated in the storage medium. In response to this, the value of the flag "F2" of a record whose tag ID is the tag ID "T201" is set to "1". Moreover, the flag processing is carried out as follows. Specifically, a value of the trigger TR2 is set to "1" and the value of the Time is set to "0" since (i) negation of exclusive logical OR of the flag F1 and the flag F2 is "1", (ii) logical AND of (a) the negation of exclusive disjunction of the flag F1 and the flag F2 and (b) the flag F1 is "1", and (ii) a value of the trigger TR1 is "1". Further, since the value of the Time is smaller than the threshold value, the value of the Time is incremented by 1 (i.e., the value of the Time is set to "1"). Further, the value of the flag DF1 is set to be the same as that of the flag F1, i.e., set to "1", and the value of the flag DF2 is set to be the same as that of the flag F2, i.e., set to "1". FIG. 12 shows the tag ID management table thus changed.

Subsequently, in a case where the product 200 is moved so that the RFID tag 100 moves to a part of the second region 222 which part does not overlap the first region 221, only the second tag reader/writer 14 reads the tag ID "T201" of the RFID tag 100. The information thus read by the second tag reader/writer 14 is received by the second receiving section 102.

The movement direction judging section 103 reads out the tag ID accumulated in the storage medium, as in the above case. Then, the movement direction judging section 103 judges whether or not a tag ID (first read information) acquired this time by the first tag reader/writer 12 matches the tag ID accumulated in the storage medium. In this case, it is determined that the tag ID (first read information) acquired by the first tag reader/writer 12 does not match the tag ID accumulated in the storage medium. In response to this, the value of the flag "F1" of the tag ID "T201" is set to "0". Meanwhile, the tag ID acquired by the second tag reader/writer 14 matches the tag ID accumulated in the storage medium. Therefore, the value of the flag "F2" is set to "1". Further, in the flag processing, a value of the flag RT is set to "1" and the value of the flag End is set to "1" since (i) logical AND of (a) the exclusive disjunction of the flag F1 and the flag F2 and (b) the flag F2 is "1", (ii) the value of the trigger TR2 is "1", and (iii) the value of the Time is smaller than the threshold value "5". Since the value of the Time is smaller than the threshold value, the value of the Time is incremented by 1 (i.e., the value of the Time is set to "2"). Further, the value of the DF1 is set to be the same as that of the flag F1, i.e., set to "0". FIG. 13 shows the tag ID management table thus changed.

A tag ID in which a value of the flag LT or a value of the flag RT is "1" is a tag ID whose movement direction has been judged. In a case where a value of the flag RT of a tag ID is "1", it means that the movement direction judging section 103 has judged that an RFID tag 100 corresponding to the tag ID is moving in a direction pointing from the first region 221 towards the second region 222. In a case where a value of the flag LT of a tag ID is "1", it means that the movement direction judging section 103 has judged that an RFID tag 100 corresponding to the tag ID is moving in a direction pointing from the second region 222 towards the first region 221.

The value of the flag LT is set to "1" in a case where an RFID tag 100 which has moved from the first region 221 to the overlapping region 223 (i.e., an RFID tag 100 whose flag TR2 became "1") has not moved to a part of the second region 222 which part does not overlap the first region 221 before the value of the Time becomes not less than the threshold value "5" (e.g., in a case where movement of the conveyer belt 30 is reversed so that the RFID tag 100 moves in a direction pointing from the second region 222 towards the first region 221). This process corresponds to the processes in S703 and S704, for example.

In a case where the conveyer belt 30 moves in an opposite direction to that described above, i.e., in a case where the product 200 moves in a direction pointing from the second region 222 towards the first region 221, the tag ID is read in an order reverse to that described above, i.e., the tag ID is read in the following order: the part of the second region 222 which part does not overlap the first region 221, the overlapping region 223, and a part of the first region 221 which part does not overlap the second region 222. As a result, the value of the flag LT of the tag ID "T201" is set to "1".

Even if the flag End has been set to "1", the movement direction detecting processing is carried out again in a case where a tag ID whose movement direction has been judged to be a direction pointing from the first region 221 towards the second region 222 is detected again in the second region 222 (or in a case where a tag ID whose movement direction has been judged to be a direction pointing from the second region 222 towards the first region 221 is detected again in the first region 221), as explained in the Step S706. Specifically, values of the flag DR and the flag DL are set to be the same as those of the flag RT and the flag LT, respectively, and then the value of the flag End is reset to "0".

The following description deals with the moving tag judging processing. The following description deals with an example in which a second RFID tag whose tag ID is "T202", a third RFID tag whose tag ID is "T203", and a fourth RFID tag whose tag ID is "T204" are present besides the RFID tag whose tag ID is "T201". Further, it is assumed that the threshold value M used in judging whether an RFID tag is a moving tag or not is set to "1", for example.

Products to which the second through fourth RFID tags are attached respectively are disposed somewhere in the first region 221 and the second region 222. It is assumed that these products do not move.

In this case, it is assumed that a tag ID of an RFID tag 100a located in the second region 222 and tag IDs of the respective second through fourth RFID tags located somewhere in the first region 221 and the second region 222 are read in the first reading process. At least one of the first receiving section 101 and the second receiving section 102 of the tag information processing apparatus 10 receives the tag IDs acquired in the first reading process. The detection frequency information acquisition section 104 causes the tag IDs (result of the first reading process) received by at least one of the first receiving section 101 and the second receiving section 102 to be accumulated in a memory or the like.

FIG. 14 is a view showing read information accumulated by the detection frequency information acquisition section 104. The read information is a list of tag IDs obtained by reading respective RFID tags. In this case, the read information is referred to as "read information 1" since reading order is expressed by "1". In this specific example, read information S (S is an integer) is read information obtained by carrying out S-th reading process. Provided that the latest read information is referred to as read information 1, "S" of the read information S can be considered as a value indicating that the read information S is the S-th newest read information among read information (including the latest read information) accumulated in the memory.

The detection frequency information acquisition section 104 judges whether or not read information N is accumulated in the memory such as a storage medium (not shown) in which the read information is stored. Since only the read information 1 is stored in the memory, the tag information processing apparatus 10 does not carry out moving tag judging processing. Then, the tag information processing apparatus 10 increments, by 1, a value indicative of an order in which the read information accumulated in the storage medium is read. This causes the read information 1 to be changed into read information 2.

Then, it is assumed that the second reading process is carried out. It is assumed that at this point, the RFID tag 100 has moved from the second region 222 to an outside of the first region 221 and the second region 222. It is also assumed that the tag ID of the second RFID tag cannot be read due to a change in radio wave reception status. At least one of the first receiving section 101 and the second receiving section 102 receives the tag ID "T203" of the third RFID tag and the tag ID "T204" of the fourth RFID tag. The detection frequency information acquisition section 104 causes the tag IDs received by at least one of the first receiving section 101 and the second receiving section 102 to be stored, as read information whose reading order is expressed by "1", in the storage medium (not shown) or the like.

FIG. 15 is a view showing the read information acquired by carrying out the two reading processes.

The detection frequency information acquisition section 104 judges whether or not the read information N is stored in the memory such as a storage medium (not shown) in which the read information is stored. Since only the read information 1 and the read information 2 are stored in the memory, the tag information processing apparatus 10 does not carry out moving tag judging processing. Then, the tag information processing apparatus 10 increments, by 1, a value indicative of an order in which the read information accumulated in the storage medium is read. This causes the read information 1 to be changed into read information 2, and causes the read information 2 to be changed into read information 3.

After this, similar processing is repeatedly carried out.

Then, it is assumed that the N-th reading process is carried out, and the detection frequency information acquisition section 104 causes read information acquired by carrying out the N-th reading process to be stored in the storage medium.

FIG. 16 is a view showing read information accumulated by the detection frequency information acquisition section 104. Note that read information N is read information acquired in the oldest reading process among first through N-th reading processes. Note also that read information 1 is read information acquired in the latest reading process among first through N-th reading processes.

Then, the detection frequency information acquisition section 104 judges whether or not the read information N is stored in the memory such as a storage medium (not shown) in which the read information is stored. Since the read information N is stored in the memory, the tag information processing apparatus 10 carries out the moving tag judging processing.

First, the detection frequency information acquisition section 104 reads out one of tag IDs of the read information N. Here, the detection frequency information acquisition section 104 acquires the tag ID "T201" which is a tag ID at the top of the read information N.

Next, the detection frequency information acquisition section 104 reads out, one by one, the tag IDs of read information (N−1), which is read information acquired in the second oldest reading process, and then compares the tag ID "T201", which is a tag ID at the top of the read information N, with the tag IDs thus read out so as to judge whether or not the tag ID "T201" matches the tag IDs thus read out. In a case where there are tag IDs which match the tag ID "T201", the detection frequency information acquisition section 104 counts the number of tag IDs which match the tag ID "T201". Since the read information (N−1) contains no tag ID which matches the tag ID "T201", the detection frequency information acquisition section 104 does not carry out the counting operation. Similarly, the detection frequency information acquisition section 104 judges whether or not read information (N−2), which is read information acquired in the third oldest reading process, contains a tag ID which matches the tag ID "T201". Since the read information (N−2) contains no tag ID which matches the tag ID "T201", the detection frequency information acquisition section 104 does not carry out the counting operation.

Similarly, the detection frequency information acquisition section 104 compares the tag ID "T201" with tag IDs contained in all other read information (read information (N−3) through read information 1). Since any of the read information (N−1) through read information 1 does not contain the tag ID "T201", the number of tag IDs which match the tag ID "T201" is "0".

Then, the number of tag IDs which match the tag ID "T201" which is a tag ID at the top of the read information N is compared with the threshold value M. Since the number of tag IDs which match the tag ID "T201" is "0" which is smaller than the threshold value M (=1), the following condition for judging a moving tag is satisfied: "detection frequency information (number of matching) is less than M". Therefore, it is determined that the tag ID "T201" is a tag ID of a moving tag which has moved out of the first region 221, and the tag ID "T201" is temporarily stored in the storage medium (not shown) such as a memory.

Next, the detection frequency information acquisition section 104 acquires the tag ID "T202" which is the second tag ID from the top of the read information N.

Then, the detection frequency information acquisition section 104 reads out, one by one, the tag IDs of the read information (N−1), which is acquired in the second oldest reading process. The detection frequency information acquisition section 104 compares the tag ID "T202", which is the second tag ID from the top of the read information N, with the tag IDs thus read out so as to judge whether or not the read information (N−1) contains a tag ID which matches the tag ID "T202". In a case where the read information (N−1) contains a tag ID which matches the tag ID "T202", the detection frequency information acquisition section 104 counts the number of tag IDs which match the tag ID "T202". Since the tag ID at the top of the read information (N−1) matches the tag ID "T202", the tag ID at the top of the read information (N−1) is included in the number of tag IDs which match the tag ID "T202". After the number of tag IDs in the read information (N−1) is counted, the detection frequency information acquisition section 104 similarly judges whether the read information (N−2), which is acquired in the third oldest reading process, contains a tag ID which matches the tag ID "T202". Since the read information (N−2) contains a tag ID which matches the tag ID "T202", the tag ID which matches the tag ID "T202" is included in the number of tag IDs which match the tag ID "T202".

Similarly, the detection frequency information acquisition section 104 compares the tag ID "T202" with tag IDs contained in all other read information (read information (N−3) through read information 1).

In a case where only two of the read information (N−1) through the read information 1 contain the tag ID "T202" due to a low read rate of the second RFID tag, the number of tag IDs which match the tag ID "T202" is "2".

Then, the movement judging section 105 compares the number of tag IDs which match the tag ID "T202", which is the second tag ID from the top of the read information N, with the threshold value M. Since the number of tag IDs which match the tag ID "T202" is "2" which is larger than the threshold value M (=1), the tag ID "T202" is temporarily stored, as a tag ID of a remaining tag which remains in the first region 221, in the storage medium (not shown) such as a memory.

Similar processing is carried out as for the tag ID "T203" which is the third tag ID from the top of the read information N and the tag ID "T204" which is the fourth tag ID from the top of the read information N in this order. When such processing carried out with respect to the tag ID "T204" which is the fourth tag ID from the top of the read information N is completed, the acquisition of a tag ID from the read information N is finished since no other tag ID is contained in the read information N.

FIG. 17 is a moving tag management table in which tag IDs of moving tags and remaining tags stored in a memory (not shown) or the like are managed. The moving tag management table has an item "ID" and an item "tag attribute". The item "ID" indicates a type of a tag ID. The item "tag attribute" indicates whether an RFID tag corresponding to the tag ID is a moving tag or a remaining tag. An RFID tag whose "tag attribute" is "moving tag" is a moving tag. Note that it is possible that no record concerning a remaining tag is managed in the moving tag management table.

According to the moving tag judgment processing, it is determined whether an RFID tag is a moving tag or not, based on how many times a tag ID of the RFID tag appears in plural read results. This makes it possible to accurately judge whether or not an RFID tag has moved out of both of the first region and the second region, even if a read rate of the RFID tag 100 is low.

The following description deals with a specific example of (i) the processing in which it is determined whether a judgment result concerning a movement direction of an RFID tag is outputted or not and (ii) processing in which information of the judgment result concerning the movement direction of the RFID tag is outputted.

The output judging section 106 judges whether or not an RFID tag 100 whose movement direction has been judged by the movement direction judging section 103, i.e., an RFID tag 100 whose judgment result concerning a movement direction has been obtained matches an RFID tag 100 which has been judged, by the movement judging section 105, to have moved out of the first region 221 and the second region 222 and which is managed in the moving tag management table as shown in FIG. 17. Specifically, the output judging section 106 judges whether or not a tag ID of an RFID tag whose judgment result concerning a movement direction has been obtained as a result of the movement direction judging processing of the movement direction judging section 103, i.e., a tag ID whose flag RT, flag LT, flag DR or flag DL is "1" matches the tag ID "T201" of the RFID tag that has been judged, as a moving tag, by the movement judging section 105. In a case where the tag ID whose judgment result concerning a movement direction has been obtained matches the tag ID "T201", the tag ID is acquired. In this case, the tag ID "T201" is acquired.

Then, the output section 107 acquires an item whose value is "1" from among the items "RT", "LT", "DR" and "DL" of the tag ID "T201" acquired by the output judging section 106, in the management table as shown in FIG. 13. In this case, the output section 107 acquires the item "RT". Then, the output section 107 acquires, from a movement information management table (not shown) or the like, information "movement from the first region to the second region", which is information indicative of a movement direction corresponding to the flag RT thus acquired, by carrying out a search or the like. Note that the movement information management table is prepared in advance in the storage medium (not shown), and that in the movement information management table, a flag such as the flag RT, LT, DR or DL is associated with information indicative of a movement direction corresponding to the flag. Then, the output section 107 outputs the information thus acquired, for example, to the information processing apparatus 2000 along with the tag ID "T201". Note that the information indicative of a movement direction which information is prepared in advance may be information indicating that an RFID tag has moved from the first region to the second region or may be information indicating that transportation has successfully completed. Note also that the output section 107 may output information indicative of the flag RT ("RT" for example) to the information processing apparatus 2000 or the like along with the tag ID "T201".

Thus, a movement direction of an RFID tag 100 can be managed in the information processing apparatus 2000 with the use of information outputted by the output section 107.

Figure 18:
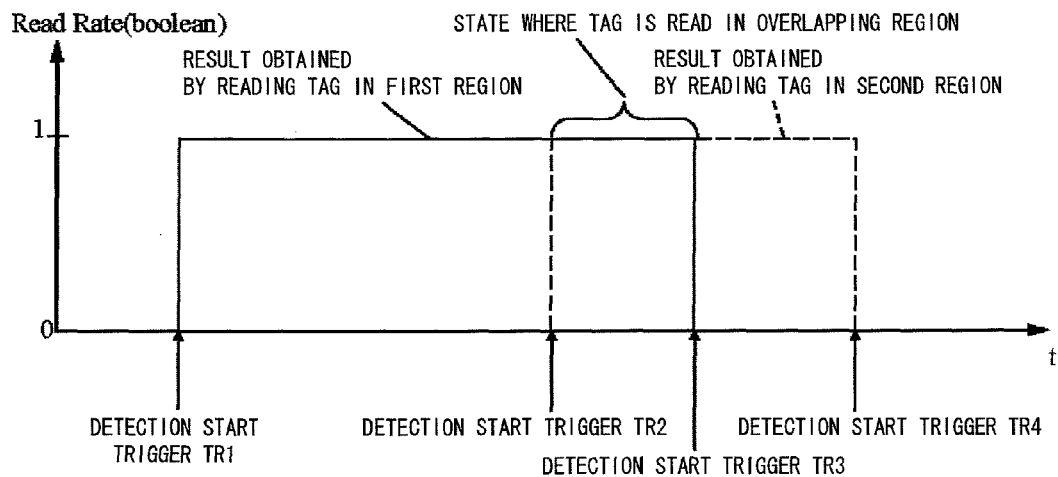
FIG. 18 is a view showing how a result obtained by reading a moving RFID tag is changed with passage of time, which view if for explaining the embodiment.

FIG. 18 is a view showing how a result obtained by reading an RFID tag 100 by use of the first tag reader/writer 12 and the second tag reader/writer 14 is changed with passage of time, the RFID tag 100 moving in a direction pointing from the first region towards the second region. In FIG. 18, the solid line indicates a result of a reading process carried out by the first tag reader/writer 12 and the broken line indicates a result of a reading process carried out by the second tag reader/writer 14. In FIG. 18, timings at which values of the triggers TR1 through TR4 as shown in FIG. 3 are shifted from "0" to "1" are shown.

In a case where a read rate of the RFID tag 100 is sufficiently high for the first tag reader/writer 12 to surely read a tag ID of the RFID tag 100 in the first region and for the second tag reader/writer 14 to surely read the tag ID of the RFID tag 100 in the second region, a movement direction of the RFID tag 100 can be accurately judged by the movement direction judging section 103 alone.

However, in a case where the read rate of the RFID tag 100 is not high, it is impossible to surely read the RFID tag 100 in the first region and the second region. For example, a case where the first tag reader/writer 12 cannot read the RFID tag 100 in the first region frequently occurs. This may result in that the movement direction judging section 103 incorrectly judge the movement direction of the RFID tag 100. That is, the movement direction judging processing cannot be accurately carried out. For example, in a case where the first tag reader/writer 12 cannot read a tag ID of an RFID tag 100 that has moved from the second region to the first region, the movement direction judging section 103 may judge that the RFID tag 100 has moved in a direction different from the direction pointing from the second region towards the first region.

Figure 19:
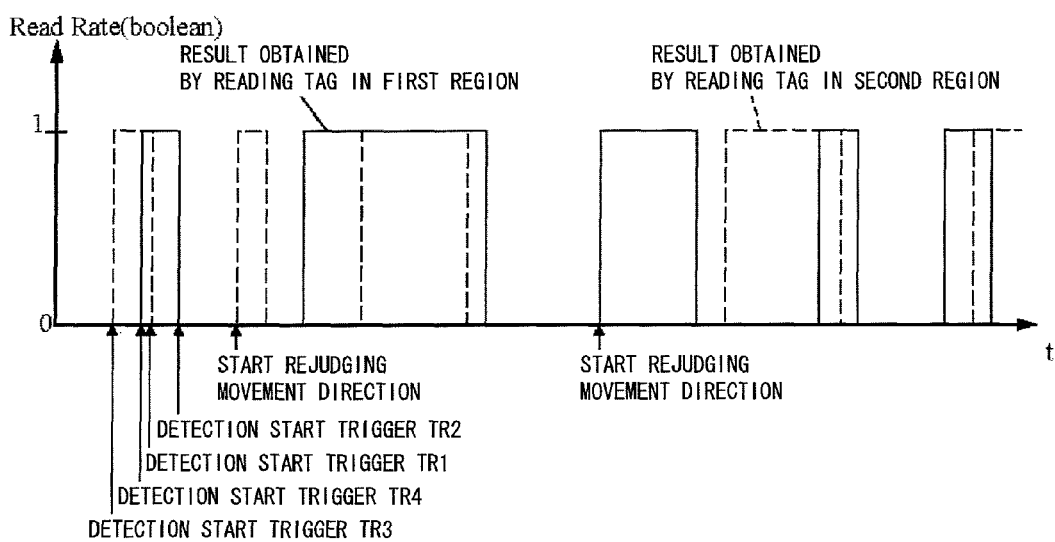
FIG. 19 is a view showing how a result obtained by reading a RFID tag which is not moving is changed with passage of time, which view if for explaining the embodiment.

FIG. 19 is a view showing how a result obtained by reading an RFID tag 100 by use of the first tag reader/writer 12 and the second tag reader/writer 14 is changed with passage of time, the RFID tag remaining in the overlapping region where the first region and the second region overlap each other. In FIG. 19, the solid line indicates a result of a reading process carried out by the first tag reader/writer 12 and the broken line indicates a result of a reading process carried out by the second tag reader/writer 14. In FIG. 19, timings at which values of the triggers TR1 through TR4 as shown in FIG. 3 are shifted from "0" to "1" are shown.

Even in the case of an RFID tag 100, in a case where a read rate of the RFID tag 100 is not high as shown in FIG. 19, a tag ID of the RFID tag 100 alternates between a readable state and an unreadable state in a short period of time. This may cause the movement direction judging section 103 to judge that the RFID tag 100 has moved plural times in a short period of time. As a result, the movement direction judging section 103 may judge a movement direction of the RFID tag 100 which has not moved at all.

In contrast, according to the present embodiment, even if a read rate of an RFID tag is low, the detection frequency information acquisition section 104 and the movement direction judging section 105 accurately judge whether or not the RFID tag 100 has moved out of both of the first region and the second region. Even if the movement direction of the RFID tag 100 is judged by the movement direction judging section 103, a judgment result concerning the movement direction is outputted only in a case where it is determined that the RFID tag 100 has moved out of both of the first region and the second region. In other cases, for example, in a case where it is determined that the RFID tag 100 is remaining somewhere in the first region and the second region, the judgment result concerning the movement direction is not outputted. This can prevent the output section 107 from outputting, as information indicative of the movement direction of the RFID tag 100, information indicative of a movement direction incorrectly judged due to low read rate of the RFID tag 100.

As described above, according to the present embodiment, (i) a movement direction of an RFID tag is judged based on a result obtained by carrying out an RFID tag reading process with respect to the first region and the second region which overlap each other, (ii) appearance frequency of the RFID tag is acquired based on the result, (iii) it is determined, based on the appearance frequency, that the RFID tag has moved out of both of the first region and the second region, and (iv) the movement direction of the RFID tag is outputted in a case where the RFID tag whose movement direction has been judged matches the RFID tag which has moved out of both of the first region and the second region. This makes it possible to accurately detect a movement direction of an RFID tag.

In the above embodiment, each processing (each function) may be realized by integrated processing by a single apparatus (system) or may be realized by distributed processing by a plurality of apparatuses.

Further, in the above embodiment, two or more communication means (e.g., first receiving section, second receiving section, output section) provided in a single apparatus may be realized by a single medium (may be physically integrated with one another).

Further, in the above embodiment, information related to processing executed by each constituent (e.g. information received, acquired, selected, generated, or transmitted by each constituent, threshold value or formula used in processing executed by each constituent, information such as address) may be stored in a storage medium (not shown) temporarily or for a long time even if no such statement is made in the above explanation. Each constituent or an accumulation section (not shown) may accumulate information in the storage medium (not shown). Further, each constituent or a reading section (not shown) may read out information in the storage medium (not shown).

The above embodiment has dealt with a case where the tag information processing apparatus is a stand-alone apparatus. However, the tag information processing apparatus may be a stand-alone apparatus or may be a server apparatus in a server/client system. In a case where the tag information processing apparatus is a server apparatus in a server/client system, an output section outputs a screen image and a receiving section receives input via a communication line.

Further, in the above embodiment, each constituent may be constituted by a dedicated hardware, or in a case where each constituent can be realized by software, each constituent may be realized by executing a program. For example, each constituent can be realized as follows: a program executing section such as a CPU reads out and executes a software program stored in a storage medium such as a hard disc or a semiconductor memory.

Software by which the tag information processing apparatus of the above embodiment is realized is a program for causing a computer to function as a tag information processing apparatus which processes information acquired by carrying out an RFID tag reading process with respect to each of a first region and a second region which are different from each other and which have an overlapping region where the first region and the second region overlap each other, the program causing the computer to function as: a first receiving section which receives first read information which is acquired by carrying out the RFID tag reading process with respect to the first region; a second receiving section which receives second read information which is acquired by carrying out the RFID tag reading process with respect to the second region; a movement direction judging section which judges a movement direction of an RFID tag in a case where the first read information and the second read information indicate that the RFID tag has moved out of a part of the first region which part does not overlap the second region; a detection frequency information acquisition section which acquires detection frequency information indicative of how many times first read information and/or second read information acquired by reading the RFID tag appears in plural sets of the first read information and the second read information which are acquired by carrying out the RFID tag reading process plural times and are then received by the first receiving section and the second receiving section; a movement judging section which judges, based on the detection frequency information acquired by the detection frequency information acquisition section, whether or not the RFID tag has moved out of both of the first region and the second region; an output judging section which judges whether or not the RFID tag whose movement direction has been judged by the movement direction judging section matches the RFID tag which has been judged, by the movement judging section, to have moved out of both of the first region and the second region; and an output section which outputs the movement direction judged by the movement direction judging section in a case where the output judging section judges that the RFID tag whose movement direction has been judged by the movement direction judging section matches the RFID tag which has been judged, by the movement judging section, to have moved out of both of the first region and the second region.

Note that functions which can be realized by the program do not include function which can be realized only by hardware. For example, the functions which can be realized by the program do not include function which can be realized only by hardware such as modem or interface guard provided in an acquisition section which acquires information, an output section which outputs information, or the like.

The program may be executed by a single computer or may be executed by a plurality of computers. In other words, the program may be to execute a centralized process or may be to execute a distributed process.

FIG. 20 is a view schematically illustrating an example of an appearance of a computer which executes the program so as to realize the tag information processing apparatus of the above embodiment. The tag information processing apparatus of the above embodiment can be realized by computer hardware and a computer program executed by the computer hardware.

In FIG. 20, a computer system 900 includes a computer 901 including a CD-ROM (Compact Disc Read Only Memory) drive 905 and an FD (Floppy (Registered Trademark) Disc) drive 906, a keyboard 902, a mouse 903, and a monitor 904.

Figure 21:
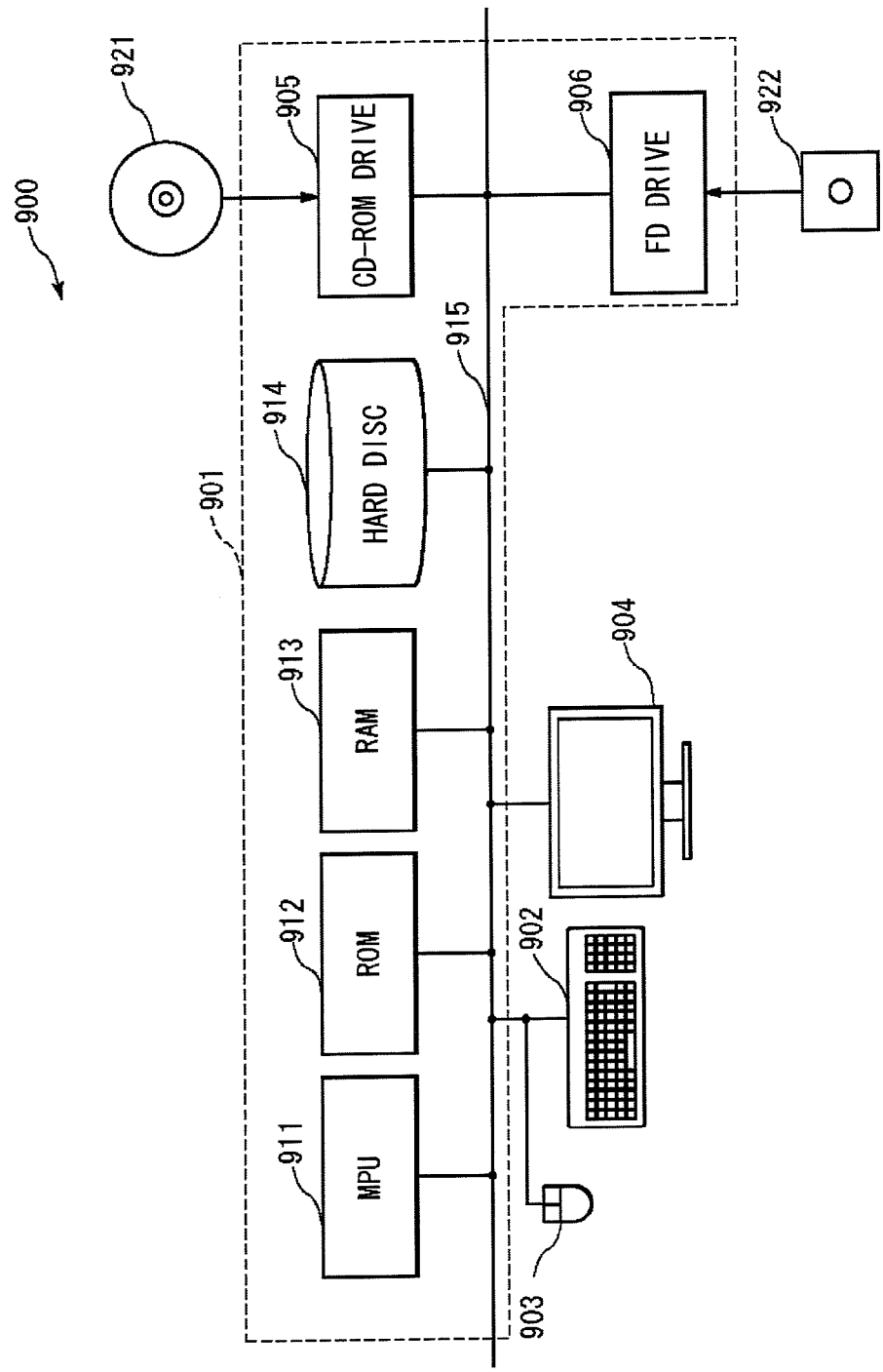
FIG. 21 is a view illustrating an example of an arrangement of the computer system of the embodiment.

FIG. 21 is a view illustrating an internal arrangement of the computer system 900. In FIG. 21, the computer 901 includes, in addition to the CD-ROM drive 905 and the FD drive 906, (i) an MPU (Micro Processing Unit) 911, (ii) a ROM 912 in which a program such as a boot-up program is stored, (iii) a RAM (Random Access Memory) 913 which is connected to the MPU 911, in which a command from an application program is temporarily stored, and which provides a temporary storage area, (iv) a hard disc 914 in which an application program, a system program and data are stored, and (v) a bus 915 via which the MPU 911, the ROM 912 etc. are connected to one another. Note that the computer 901 may include a network card (not shown) which provides connection to LAN.

A program which is executed by the computer system 900 so that the functions of the tag information processing apparatus of the above embodiment can be realized may be stored in a CD-ROM 921 or may be stored in an FD 922. The CD-ROM 921 (or the FD 922) in which the program is stored may be inserted into the CD-ROM drive 905 (or the FD drive 906) so that the program is transmitted to the hard disc 914. Alternatively, the program may be transmitted to the computer 901 via network (not shown) and stored in the hard disc 914. When the program is executed, the program is loaded into the RAM 913. Note that the program may be directly loaded from the CD-ROM 921 or the FD 922 or may be directly loaded from network.

The program may not necessarily include an operating system (OS), a third party program or the like for causing the computer 901 to execute the functions of the tag information processing apparatus of the above embodiment. The program may include only commands for calling up an appropriate function (module) in a controlled manner so that a desired result can be obtained. It is well known how the computer system 900 operates, and therefore the operation of the computer system 900 is not described in detail.

As described above, a tag information processing apparatus of the present invention is a tag information processing apparatus which processes information acquired by carrying out an RFID tag reading process with respect to each of a first region and a second region which are different from each other and which have an overlapping region where the first region and the second region overlap each other, the tag information processing apparatus including: a first receiving section which receives first read information which is acquired by carrying out the RFID tag reading process with respect to the first region; a second receiving section which receives second read information which is acquired by carrying out the RFID tag reading process with respect to the second region; a movement direction judging section which judges a movement direction of an RFID tag in a case where and from a fact that the first read information and the second read information indicate that the RFID tag has moved out of a part of the first region which part does not overlap the second region; a detection frequency information acquisition section which acquires detection frequency information indicative of how many times first read information and/or second read information acquired by reading the RFID tag appears in plural sets of the first read information and the second read information which are acquired by carrying out the RFID tag reading process plural times and are then received by the first receiving section and the second receiving section; a movement judging section which judges, based on the detection frequency information acquired by the detection frequency information acquisition section, whether or not the RFID tag has moved out of both of the first region and the second region; an output judging section which judges whether or not the RFID tag whose movement direction has been judged by the movement direction judging section matches the RFID tag which has been judged, by the movement judging section, to have moved out of both of the first region and the second region; and an output section which outputs the movement direction judged by the movement direction judging section in a case where the output judging section judges that the RFID tag whose movement direction has been judged by the movement direction judging section matches the RFID tag which has been judged, by the movement judging section, to have moved out of both of the first region and the second region.

According to the arrangement, (i) a movement direction of an RFID tag is judged based on a result obtained by carrying out an RFID tag reading process with respect to the first region and the second region which overlap each other, (ii) appearance frequency of the RFID tag is acquired based on the result, (iii) it is determined, based on the appearance frequency, that the RFID tag has moved out of both of the first region and the second region, and (iv) the movement direction of the RFID tag is outputted in a case where the RFID tag whose movement direction has been judged matches the RFID tag which has moved out of both of the first region and the second region. This makes it possible to accurately detect a movement direction of an RFID tag.

The tag information processing apparatus of the present invention is arranged such that the movement direction judging section judges that the movement direction of the RFID tag is a direction pointing from the first region towards the second region in a case where the first read information and the second read information indicate that the RFID tag has moved from the part of the first region which part does not overlap the second region to a part of the second region which part does not overlap the first region.

According to the arrangement, it is possible to accurately detect a movement direction of an RFID tag which has moved in a direction pointing from the first region towards the second region.

The tag information processing apparatus of the present invention is arranged such that in a case where only the first read information indicates presence of the RFID tag, the movement direction judging section judges that the RFID tag is located in the part of the first region which part does not overlap the second region, and in a case where only the second read information indicates the presence of the RFID tag, the movement direction judging section judges that the RFID tag is located in the part of the second region which part does not overlap the first region.

According to the arrangement, it is possible to accurately detect a movement direction of an RFID tag.

The tag information processing apparatus of the present invention is arranged such that the movement direction judging section judges that the movement direction of the RFID tag is a direction different from a direction pointing from the first region towards the second region in a case where the first read information and the second read information indicate that the RFID tag has not moved to the part of the second region which part does not overlap the first region within a predetermined period of time after the first read information and the second read information indicate that the RFID tag has moved from the part of the first region which part does not overlap the second region to the overlapping region.

According to the arrangement, it is possible to accurately detect a movement direction of an RFID tag which has moved in a direction pointing from the second region towards the first region after moving from the first region to the overlapping region.

The tag information processing apparatus of the present invention is arranged such that the movement direction judging section judges that the movement direction of the RFID tag is a direction pointing from the second region towards the first region in a case where the first read information and the second read information indicate that the RFID tag has moved from the part of the second region which part does not overlap the first region to the part of the first region which part does not overlap the second region.

According to the arrangement, it is possible to accurately detect a movement direction of an RFID tag which has moved in a direction pointing from the second region towards the first region.

A tag information processing system of the present invention is a tag information processing system which processes information acquired by carrying out an RFID tag reading process with respect to each of a first region and a second region which are different from each other and which have an overlapping region where the first region and the second region overlap each other, the tag information processing apparatus comprising: a first transmitting/receiving antenna which is capable of transmitting and receiving radio waves to/from the first region; a second transmitting/receiving antenna which is capable of transmitting and receiving radio waves to/from the second region; a first tag reader/writer which acquires first read information by carrying out the RFID tag reading process with respect to an RFID tag present in the first region with use of the first transmitting/receiving antenna; a second tag reader/writer which acquires second read information by carrying out the RFID tag reading process with respect to an RFID tag present in the second region with use of the second transmitting/receiving antenna; a first receiving section which receives the first read information acquired by the first tag reader/writer; a second receiving section which receives the second read information acquired by the second tag reader/writer; a movement direction judging section which (i) judges a movement direction of an RFID tag in a case where and from a fact that the first read information and the second read information indicate that the RFID tag has moved out of a part of the first region which part does not overlap the second region and (ii) acquires information thus judged; a detection frequency information acquisition section which acquires detection frequency information indicative of how many times first read information and/or second read information acquired by reading the RFID tag appears in plural sets of the first read information and the second read information which are acquired by carrying out the RFID tag reading process plural times and are then received by the first receiving section and the second receiving section; a movement judging section which judges, based on the detection frequency information acquired by the detection frequency information acquisition section, whether or not the RFID tag has moved out of both of the first region and the second region; an output judging section which judges whether or not the RFID tag whose movement direction has been judged by the movement direction judging section matches the RFID tag which has been judged, by the movement judging section, to have moved out of both of the first region and the second region; and an output section which outputs the movement direction judged by the movement direction judging section in a case where the output judging section judges that the RFID tag whose movement direction has been judged by the movement direction judging section matches the RFID tag which has been judged, by the movement judging section, to have moved out of both of the first region and the second region.

According to the arrangement, it is possible to accurately detect a movement direction of an RFID tag.

The present invention is not limited to the description of the embodiments above, but may be altered by a skilled person within the scope of the claims. An embodiment based on a proper combination of technical means disclosed in different embodiments is encompassed in the technical scope of the present invention.

Industrial Applicability

As described above, a tag information processing system etc. of the present invention is suitably applied as an apparatus etc. which judges a movement direction of an RFID tag, and especially suitably applied as an apparatus etc. which judges a movement direction of an RFID tag by carrying out an RFID tag reading process with respect to regions which overlap each other.

The invention claimed is:

1. A tag information processing apparatus which processes information acquired by carrying out an RFID tag reading process with respect to each of a first region and a second region which are different from each other and which have an overlapping region where the first region and the second region overlap each other, the tag information processing apparatus comprising:
a first receiving section which receives first read information which is acquired by carrying out the RFID tag reading process with respect to the first region;
a second receiving section which receives second read information which is acquired by carrying out the RFID tag reading process with respect to the second region;
a movement direction judging section which judges a movement direction of the RFID tag in a case where the first read information and the second read information indicate that the RFID tag has moved out of a part of the first region which part does not overlap the second region;
a detection frequency information acquisition section which acquires detection frequency information indicative of how many times at least one of first read information and second read information acquired by reading the RFID tag appears in plural sets of the first read information and the second read information which are acquired by carrying out the RFID tag reading process plural times and are then received by the first receiving section and the second receiving section;
a movement judging section which judges, based on the detection frequency information acquired by the detection frequency information acquisition section, whether or not the RFID tag has moved out of both of the first region and the second region;
an output judging section which judges whether or not the RFID tag whose movement direction has been judged by the movement direction judging section matches the RFID tag which has been judged, by the movement judging section, to have moved out of both of the first region and the second region; and
an output section which outputs the movement direction judged by the movement direction judging section in a case where the output judging section judges that the RFID tag whose movement direction has been judged by the movement direction judging section matches the RFID tag which has been judged, by the movement judging section, to have moved out of both of the first region and the second region.

2. The tag information processing apparatus according to claim 1, wherein
the movement direction judging section judges that the movement direction of the RFID tag is a direction pointing from the first region towards the second region in a case where the first read information and the second read information indicate that the RFID tag has moved from the part of the first region which part does not overlap the second region to a part of the second region which part does not overlap the first region.

3. The tag information processing apparatus according to claim 2, wherein:
in a case where only the first read information indicates presence of the RFID tag, the movement direction judging section judges that the RFID tag is located in the part of the first region which part does not overlap the second region, and
in a case where only the second read information indicates the presence of the RFID tag, the movement direction judging section judges that the RFID tag is located in the part of the second region which part does not overlap the first region.

4. The tag information processing apparatus according to claim 1, wherein:
the movement direction judging section judges that the movement direction of the RFID tag is a direction different from a direction pointing from the first region towards the second region in a case where the first read information and the second read information indicate that the RFID tag has not moved to the part of the second region which part does not overlap the first region within a predetermined period of time after the first read information and the second read information indicate that the RFID tag has moved from the part of the first region which part does not overlap the second region to the overlapping region.

5. The tag information processing apparatus according to claim 1, wherein:
the movement direction judging section judges that the movement direction of the RFID tag is a direction pointing from the second region towards the first region in a case where the first read information and the second read information indicate that the RFID tag has not moved to the part of the second region which part does not overlap the first region within a predetermined period of time after the first read information and the second read information indicate that the RFID tag has moved from the part of the first region which part does not overlap the second region to the overlapping region.

6. The tag information processing apparatus according to claim 2, wherein:
the movement direction judging section judges that the movement direction of the RFID tag is a direction pointing from the second region towards the first region in a case where the first read information and the second read information indicate that the RFID tag has moved from the part of the second region which part does not overlap the first region to the part of the first region which part does not overlap the second region.

7. A tag information processing system which processes information acquired by carrying out an RFID tag reading process with respect to each of a first region and a second region which are different from each other and which have an overlapping region where the first region and the second region overlap each other,
the tag information processing apparatus comprising:
a first transmitting/receiving antenna which is for transmitting and receiving radio waves to/from the first region;
a second transmitting/receiving antenna which is for transmitting and receiving radio waves to/from the second region;
a first tag reader/writer which acquires first read information by carrying out the RFID tag reading process with respect to an RFID tag present in the first region with use of the first transmitting/receiving antenna;
a second tag reader/writer which acquires second read information by carrying out the RFID tag reading process with respect to an RFID tag present in the second region with use of the second transmitting/receiving antenna;
a first receiving section which receives the first read information acquired by the first tag reader/writer;
a second receiving section which receives the second read information acquired by the second tag reader/writer;
a movement direction judging section which (1) judges a movement direction of the RFID tag in a case where the first read information and the second read information indicate that the RFID tag has moved out of a part of the first region which part does not overlap the second region and (ii) acquires information thus judged;
a detection frequency information acquisition section which acquires detection frequency information indicative of how many times at least one of first read information and second read information acquired by reading the RFID tag appears in plural sets of the first read information and the second read information which are acquired by carrying out the RFID tag reading process plural times and are then respectively received by the first receiving section and the second receiving section;
a movement judging section which judges, based on the detection frequency information acquired by the detection frequency information acquisition section, whether or not the RFID tag has moved out of both of the first region and the second region;
an output judging section which judges whether or not the RFID tag whose movement direction has been judged by the movement direction judging section matches the RFID tag which has been judged, by the movement judging section, to have moved out of both of the first region and the second region; and
an output section which outputs the movement direction judged by the movement direction judging section in a case where the output judging section judges that the RFID tag whose movement direction has been judged by the movement direction judging section matches the RFID tag which has been judged, by the movement judging section, to have moved out of both of the first region and the second region.

8. A tag information processing method for processing information acquired by carrying out an RFID tag reading process with respect to a first region and a second region which have an overlapping region where the first region and the second region overlap each other, the information being processed by a first receiving section, a second receiving section, a movement direction judging section, a detection frequency information acquisition section, a movement judging section, an output judging section, and an output section,
the tag information processing method comprising the steps of:
(a) the first receiving section receiving first read information which is acquired by carrying out the RFID tag reading process with respect to the first region;
(b) the second receiving section receiving second read information which is acquired by carrying out the RFID tag reading process with respect to the second region;
(c) the movement direction judging section judging a movement direction of the RFID tag in a case where the first read information and the second read information indicate that the RFID tag has moved out of a part of the first region which part does not overlap the second region;
(d) the detection frequency information acquisition section acquiring detection frequency information indicative of how many times at least one of first read information and second read information acquired by reading the RFID tag appears in plural sets of the first read information and the second read information which are acquired by carrying out the RFID tag reading process plural times and are then received in the step (a) and the step (b);

(e) the movement judging section judging, based on the detection frequency information acquired in the step (d), whether or not the RFID tag has moved out of both of the first region and the second region;

(f) the output judging section judging whether or not the RFID tag whose movement direction has been judged in the step (c) matches the RFID tag which has been judged, in the step (e), to have moved out of both of the first region and the second region; and (g) an output section outputting the movement direction judged by the movement direction judging section in a case where in the step (f), it is determined that the RFID tag whose movement direction has been judged in the step (c) matches the RFID tag which has been judged, in the step (e), to have moved out of both of the first region and the second region.

9. A non-transitory computer-readable storage medium in which a program for causing a computer to function as a tag information processing apparatus is stored, which tag information processing apparatus processes information acquired by carrying out an RFID tag reading process with respect to each of a first region and a second region which are different from each other and which have an overlapping region where the first region and the second region overlap each other, the program causing the computer to execute the steps of:

(a) receiving first read information which is acquired by carrying out the RFID tag reading process with respect to the first region;

(b) receiving second read information which is acquired by carrying out the RFID tag reading process with respect to the second region;

(c) judging a movement direction of the RFID tag in a case where the first read information and the second read information indicate that the RFID tag has moved out of a part of the first region which part does not overlap the second region;

(d) acquiring detection frequency information indicative of how many times at least one of first read information and second read information acquired by reading the RFID tag appears in plural sets of the first read information and the second read information which are acquired by carrying out the RFID tag reading process plural times and are then respectively received in the step (a) and the step (b);

(e) judging, based on the detection frequency information acquired by in the step (d), whether or not the RFID tag has moved out of both of the first region and the second region;

(f) judging whether or not the RFID tag whose movement direction has been judged in the step (c) matches the RFID tag which has been judged, in the step (e), to have moved out of both of the first region and the second region; and (g) outputting the movement direction judged by the movement direction judging section in a case where in the step (f), it is determined that the RFID tag whose movement direction has been judged in the step (c) matches the RFID tag which has been judged, in the step (e), to have moved out of both of the first region and the second region.

* * * * *